US009316898B2

(12) United States Patent
Homma et al.

(10) Patent No.: US 9,316,898 B2
(45) Date of Patent: Apr. 19, 2016

(54) PROJECTION APPARATUS

(71) Applicant: Sony Corporation, Tokyo (JP)

(72) Inventors: Keisuke Homma, Kanagawa (JP);
Yukio Ohmura, Tokyo (JP)

(73) Assignee: SONY CORPORATION, Tokyo (JP)

( * ) Notice: Subject to any disclaimer, the term of this patent is extended or adjusted under 35 U.S.C. 154(b) by 250 days.

(21) Appl. No.: 13/681,960

(22) Filed: Nov. 20, 2012

(65) Prior Publication Data

US 2013/0135590 A1 May 30, 2013

(30) Foreign Application Priority Data

Nov. 28, 2011 (JP) ................................. 2011-259204

(51) Int. Cl.
| | |
|---|---|
| *G03B 21/14* | (2006.01) |
| *G03B 21/20* | (2006.01) |
| *G02B 27/28* | (2006.01) |
| *G02B 6/27* | (2006.01) |
| *G02B 27/14* | (2006.01) |

(52) U.S. Cl.
CPC .......... *G03B 21/2073* (2013.01); *G02B 6/2773* (2013.01); *G02B 27/283* (2013.01); *G02B 27/145* (2013.01)

(58) Field of Classification Search
CPC ............................ G02B 27/145; G02B 27/283
USPC ................... 353/7, 20, 30, 31, 33, 37, 98, 99; 359/487.02, 487.04, 487.05, 489.05, 359/489.07, 495, 831; 348/743–747, 348/E5.141, E9.027; 349/5, 7–9
See application file for complete search history.

(56) References Cited

U.S. PATENT DOCUMENTS

| | | | | | |
|---|---|---|---|---|---|
| 5,200,843 | A | * | 4/1993 | Karasawa et al. ................. | 349/9 |
| 5,299,036 | A | * | 3/1994 | Nicolas et al. .................... | 349/9 |
| 5,374,968 | A | * | 12/1994 | Haven et al. ..................... | 353/31 |
| 6,910,773 | B2 | * | 6/2005 | Nakashima et al. ........... | 353/20 |
| 2002/0001135 | A1 | * | 1/2002 | Berman et al. ................. | 359/640 |
| 2005/0157265 | A1 | * | 7/2005 | Florence et al. ................ | 353/20 |
| 2006/0164857 | A1 | * | 7/2006 | Morejon ............ | G02B 27/0994 362/555 |
| 2006/0171035 | A1 | * | 8/2006 | Berman ............... | G02B 5/3016 359/618 |
| 2006/0274274 | A1 | * | 12/2006 | Adachi et al. ................... | 353/20 |
| 2010/0246368 | A1 | * | 9/2010 | Oto ......................... | 369/112.23 |

FOREIGN PATENT DOCUMENTS

| | | |
|---|---|---|
| JP | 07-230072 | 8/1995 |
| JP | 08-184797 | 7/1996 |
| JP | 2002-350781 | 12/2002 |
| JP | 2004-286947 | 10/2004 |
| JP | 2005-115276 | 4/2005 |
| JP | 2005-321544 A * | 11/2005 |
| JP | 2007-304607 | 11/2007 |
| JP | 2008-233252 | 10/2008 |

* cited by examiner

*Primary Examiner* — Sultan Chowdhury
(74) *Attorney, Agent, or Firm* — Frommer Lawrence & Haug LLP; William S. Frommer

(57) ABSTRACT

There is provided a projection apparatus including a color synthesis section, a polarization conversion section, and a projection lens. The color synthesis section is configured to combine three-primary color light and emit combined light. The polarization conversion section is disposed on a light-emission side of the color synthesis section, the polarization conversion section being configured to put the color light in the combined light in a non-polarized state uniformly in all directions. The projection lens is configured to emit light provided by the polarization conversion section.

10 Claims, 18 Drawing Sheets

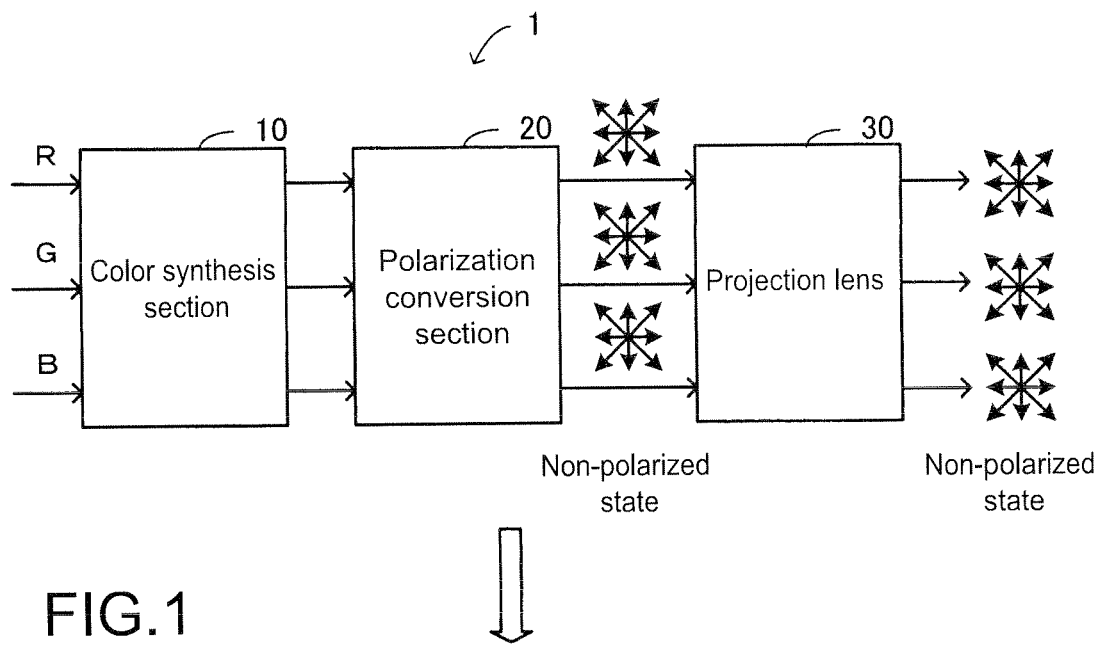
FIG.1
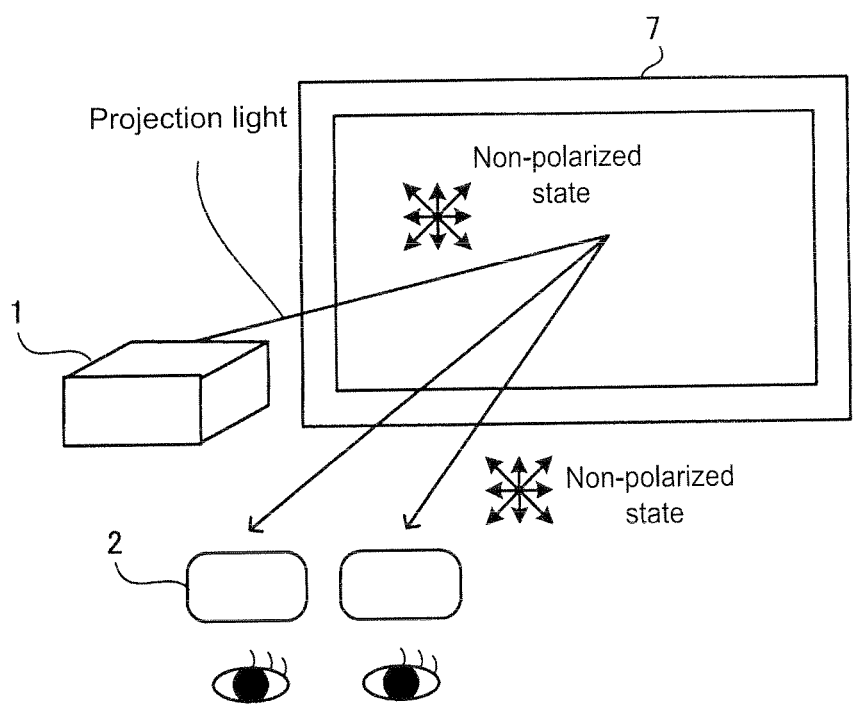

Color unevenness

Color unevenness

FIG.8

Incoming polarized light
with oscillation direction parallel
to first optical axis Outgoing polarized light

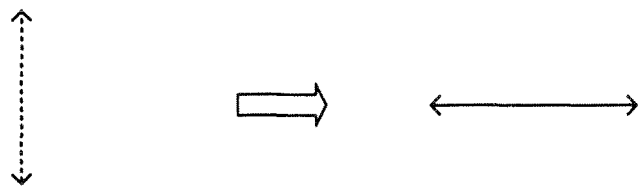

Incoming polarized light
with oscillation direction parallel
to second optical axis Outgoing polarized light

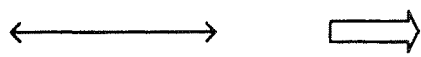 

Incoming polarized light
with oscillation direction not parallel
to first and second optical axes Outgoing polarized light

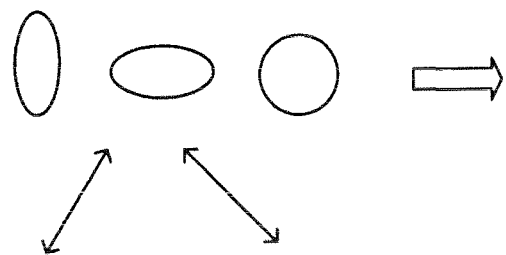 

Non-polarized state

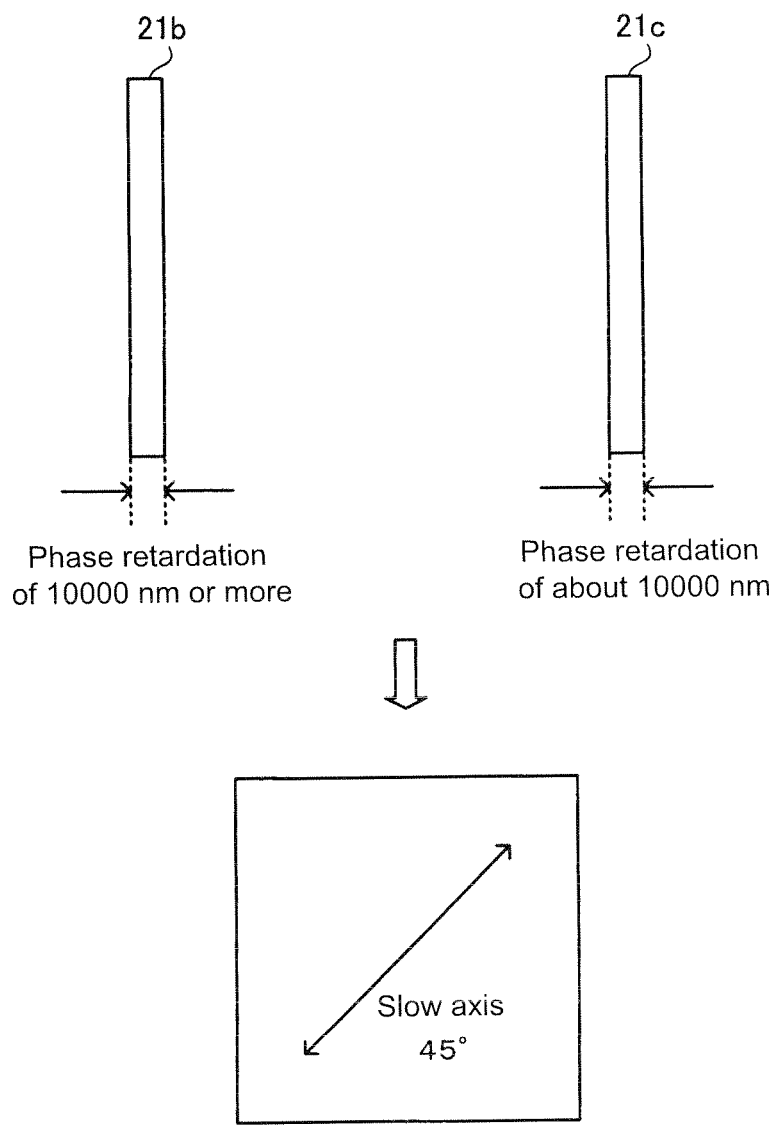

FIG.10

Incoming polarized light with oscillation direction of 45° against slow axis

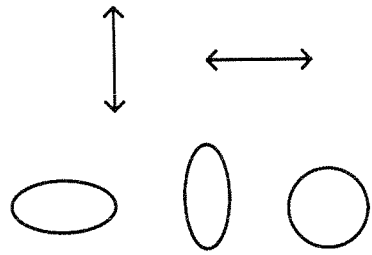

⇒

Outgoing polarized light

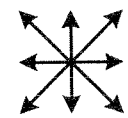

Non-polarized state

Incoming polarized light with oscillation direction of 0° or 90° against slow axis

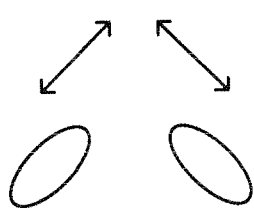

⇒

Outgoing polarized light

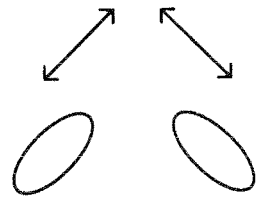

Incoming polarized light with oscillation direction of any other angle against slow axis

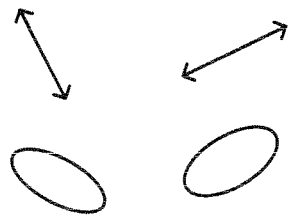

⇒

Outgoing polarized light

State where polarization patterns are greatly affected

○ : S-polarized light
↕ : P-polarized light
✳ : Non-polarized state

FIG.17
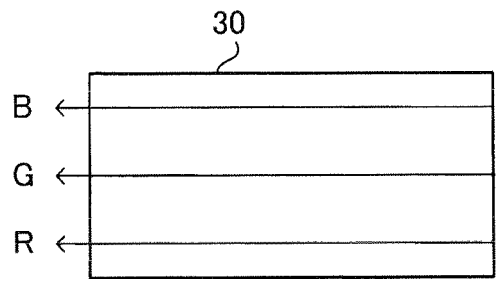
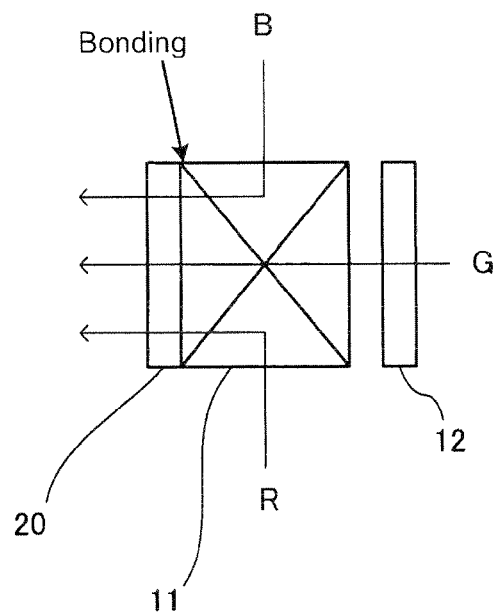
FIG.18
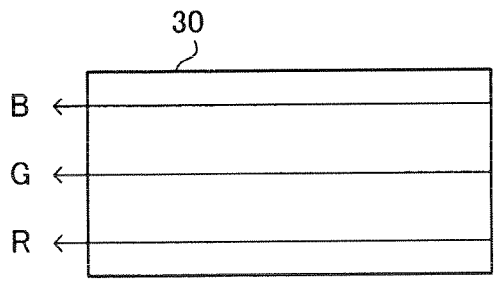
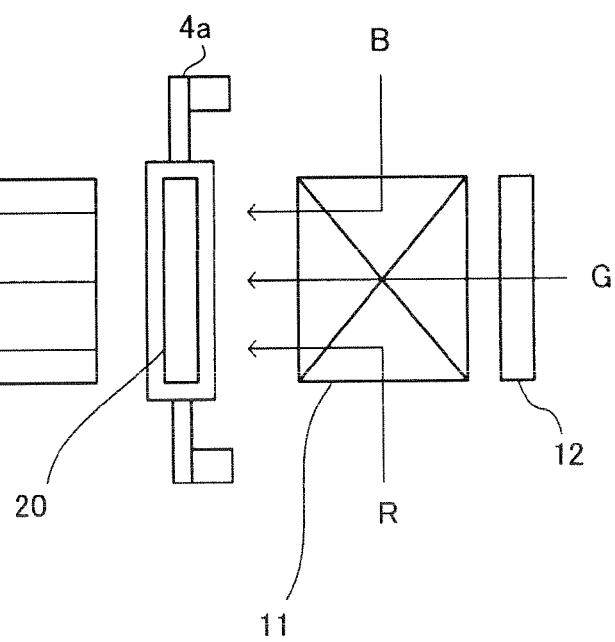

FIG.20
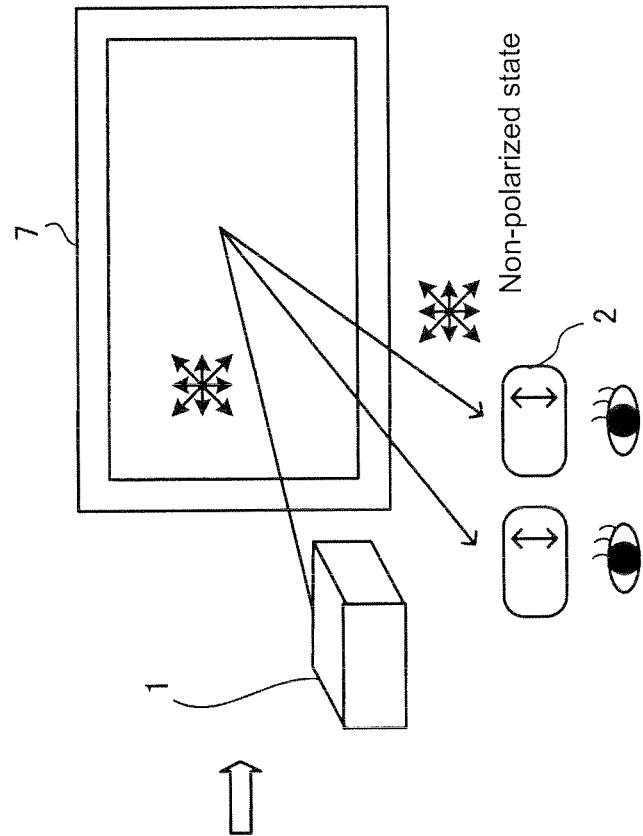
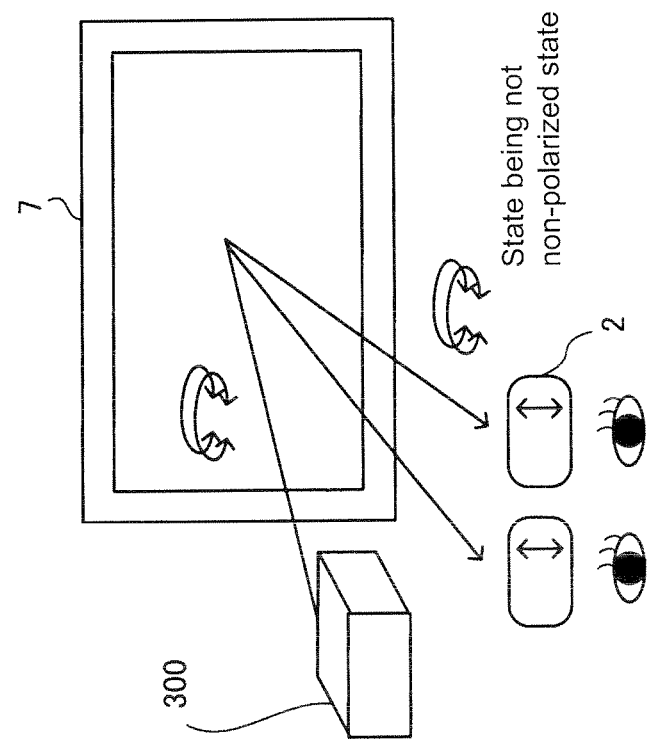

PROJECTION APPARATUS

BACKGROUND

The present technology relates to a projection apparatus performing a video display.

There has recently developed an LCD (Liquid Crystal Display) projector adopting the 3D (three-dimensional) active shutter technology.

The active shutter technology belongs to the video display technology with which sense of depth is created. With such an active shutter technology, stereoscopic viewing is achieved with parallax, which is created by alternately displaying a left-eye picture and a right-eye picture, and in synchronization with switching of the pictures, by alternately blocking the user's right and left eyes view of 3D glasses.

The issue here is that such a projector projecting 3D images as described above has a difficulty in quality control compared with a projector projecting 2D (two-dimensional) images. This is because, as for light polarized after reflection on a screen, the 3D glasses pass therethrough only components polarized in a specific direction, and this polarization state greatly affects the quality of the 3D images, i.e., causes color unevenness, and reduction of brightness.

With 2D images, the 3D glasses are not used, and thus the image quality is not affected by the polarization state of light after reflection on the screen because the light is directed into user's eyes uniformly irrespective of the polarization state. On the other hand, with an LCD projector or others adopting the 3D active shutter technology, an important factor is to give consideration to the polarization state of light before the light reaches the 3D glasses.

As a previous technology, proposed is a projection display apparatus that makes uniform the amount of RGB (Red, Green, and Blue) light in the horizontal/vertical directions, and changes the polarization state of each of the color light. As an example, see Japanese Patent Application Laid-open No. 2007-304607.

SUMMARY

With the previous projector projecting 3D images, however, before projection light therefrom reaches the 3D glasses after being reflected on the screen, no appropriate polarization conversion process is performed on the light for improving the quality of the 3D images.

There thus is a problem that a user perceives the 3D images being uneven in color when the 3D glasses are not tilted, and when the 3D glasses are tilted, the user perceives the 3D images not only being uneven in color but also being reduced in brightness.

In view of the circumstances as described above, it is thus desirable to provide a projection apparatus that considerably improves the quality of 3D images with no color unevenness when 3D glasses are not tilted, and with no color unevenness and brightness reduction when the 3D glasses are tilted.

According to an embodiment of the present technology, there is provided a projection apparatus. This projection apparatus includes a color synthesis section, a polarization conversion section, and a projection lens. The color synthesis section is configured to combine three-primary color light and emit combined light. The polarization conversion section is disposed on a light-emission side of the color synthesis section, the polarization conversion section being configured to put the color light in the combined light in a non-polarized state uniformly in all directions. The projection lens is configured to emit light provided by the polarization conversion section.

The quality of 3D images is thus to be considerably improved.

These and other objects, features and advantages of the present disclosure will become more apparent in light of the following detailed description of best mode embodiments thereof, as illustrated in the accompanying drawings.

BRIEF DESCRIPTION OF DRAWINGS

FIG. 1 is a diagram showing an exemplary configuration of a projection apparatus;

FIG. 8 is a diagram for illustrating the characteristics of the wavelength-selective half waveplate;

FIG. 9 is a diagram showing a uniaxial organic material and a uniaxial crystal;

FIG. 10 is a diagram for illustrating the characteristics of the uniaxial organic material and those of the uniaxial crystal;

FIG. 17 is a diagram showing an exemplary placement;

FIG. 18 is a diagram showing another exemplary placement;

FIG. 20 is a conceptual view of projection by the projection apparatus.

DETAILED DESCRIPTION OF EMBODIMENT

Figure 2:
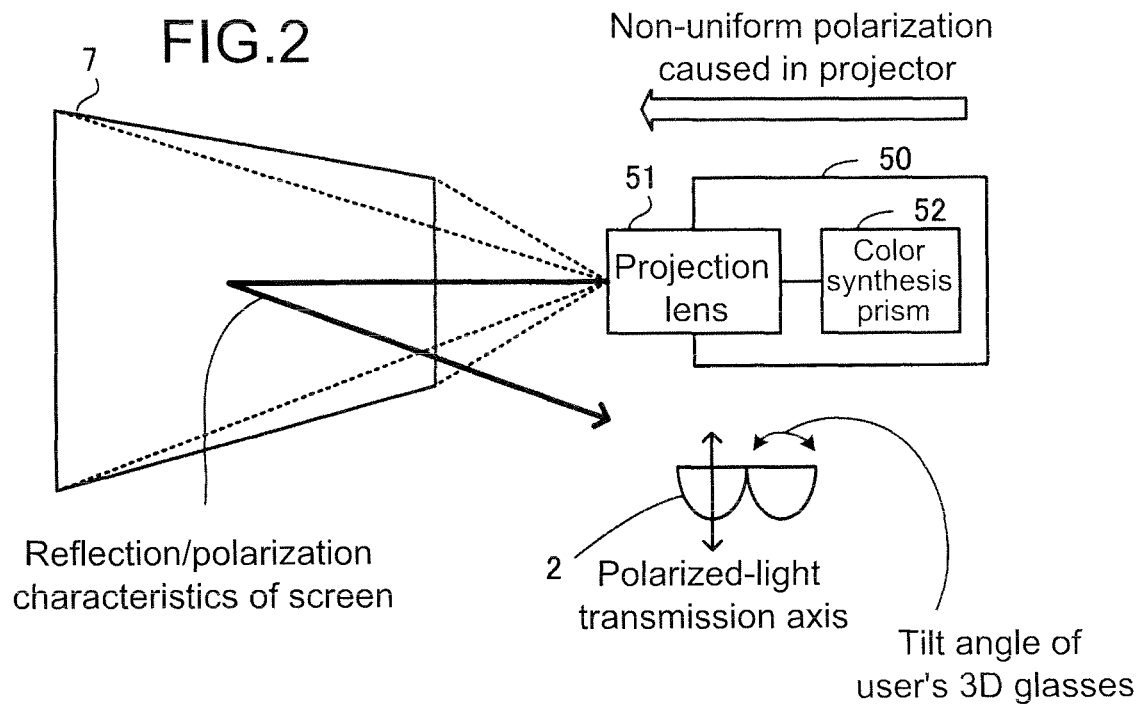
FIG. 2 is a diagram showing factors that change the polarization state of light.

Hereinafter, an embodiment of the present disclosure will be described with reference to the drawings. FIG. 1 is a diagram showing an exemplary configuration of a projection apparatus. A projection apparatus 1 includes a color synthesis section 10, a polarization conversion section 20, and a projection lens 30.

The color synthesis section 10 combines light in three primary colors of R (Red), G (Green), and B (Blue), and emits the resulting combined light. The polarization conversion section 20 is disposed on the light-emission side of the color synthesis section 10, and puts each color light in the combined light in a non-polarized state uniformly in all directions.

The projection lens 30 emits the light provided by the polarization conversion section 20 onto a screen.

In this example, the polarization conversion section 20 is any of a wavelength-selective half waveplate, a uniaxial organic material, and a uniaxial crystal. The wavelength-selective half waveplate produces a phase shift of $\pi$ with respect to light with a predetermined wavelength. The uniaxial organic material is an organic material having one optical axis, and the uniaxial crystal is a crystal having one optical axis.

Such a polarization conversion section 20 is disposed between the light-emission side of the color synthesis section 10 from which the combined light is emitted, and the light-incident side of the projection lens 30. Accordingly, each color light in the combined light coming from the color synthesis section 10 is polarized differently on a wavelength basis so that the light is put in the non-polarized state uniformly in all directions.

As such, the projection apparatus 1 is provided with the color synthesis section 10, the polarization conversion section 20, and the projection lens 30. The polarization conversion section 20 is configured to put the color light coming from the color synthesis section 10 in the non-polarized state uniformly in all directions, and the projection lens 30 is configured to emit the light in the non-polarized state.

With this configuration, the light directed by the projection apparatus 1 toward a screen 7 is in the non-polarized state uniformly in all directions, and the light entering user's 3D glasses 2 after being reflected on the screen 7 is also in the non-polarized state uniformly in all directions.

This thus considerably improves the quality of 3D images with totally no color unevenness when the 3D glasses 2 are not and with totally no color unevenness and brightness reduction when the 3D glasses 2 are tilted.

Described next in detail are problems to be solved by the present technology. FIG. 2 is a diagram showing factors that change the polarization state of light. In a projection apparatus (projector) 50, light coming from a projection lens 51 is reflected on the screen 7, and then reaches the 3D glasses 2. The polarization state of the light entering the 3D glasses 2 is affected mainly by three factors as below.

1. Non-Uniform Polarization Caused in Projector 50

The light is polarized non-uniformly in the projector 50, specifically in the part from a color synthesis prism 52 to the projection lens 51. The non-uniform polarization is caused specifically by the projection lens 51 no matter if the projection lens 51 is a glass lens or a plastic lens.

When the projection lens 51 is a glass lens, factors affecting the light to be non-uniformly polarized include the material, the shape, the AR (Anti Reflection) coating, and others of the glass lens. When the projection lens 51 is a plastic lens, factors affecting the light to be non-uniformly polarized include the material, the shape, the AR coating, the molding conditions, and others of the plastic lens. Especially with a plastic lens, the non-uniformity of polarization is very conspicuous.

2. Reflection/Polarization Characteristics of Screen 7

When the screen 7 is specifically a silver screen, incoming light remains in the same polarization state when it is reflected thereon. Therefore, the non-uniformity of polarization caused by the above-described factor 1 in the projector 50 directly affects the quality of the 3D images. Moreover, if the screen is with any in-plane non-uniformity being the polarization characteristics, with such a screen, the light is directly affected by the factor 3 below.

3. Tilt angle of User's 3D Glasses 2

As for the 3D glasses 2 under the normal use, the tilt angle thereof with respect to a polarized-light transmission axis is about ±25° when the user tilts his/her head. When the 3D glasses 2 are tilted at the angle of about ±25° because the user tilts his/her head, the 3D glasses 2 are changed also in transmission direction for the polarized light. As a result, this also greatly changes the quality of the 3D images.

Due to the polarization-state-changing factors of 1 to 3 above, the light entering the 3D glasses 2 is changed in polarization state, and there thus have previously been two main problems as below.

A. In 3D images, color unevenness is perceivable when the 3D glasses 2 are not tilted.

B. In 3D images, color unevenness and brightness reduction are perceivable when the 3D glasses 2 are tilted.

Figure 3:
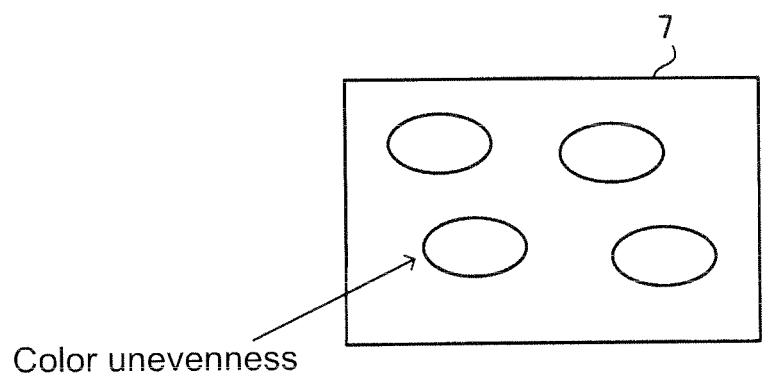
FIG. 3 is a diagram illustrating color unevenness observed via 3D glasses.
Figure 4:
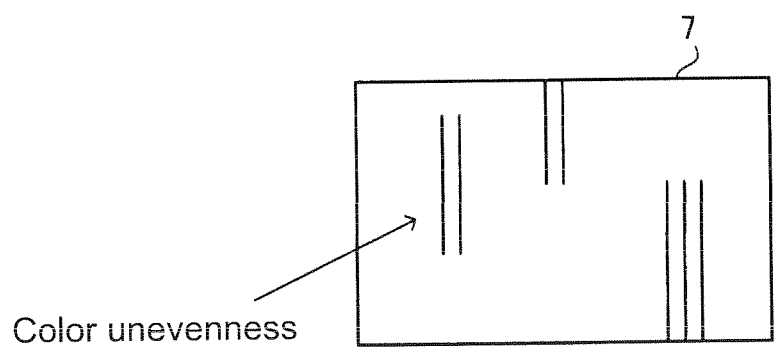
FIG. 4 is another diagram illustrating color unevenness observed via the 3D glasses.

FIGS. 3 and 4 are each a diagram illustrating color unevenness to be perceived via 3D glasses. Such color unevenness as shown in FIG. 3 (indicated by elliptical figures) may be observed on the screen 7, e.g., when the background is white in color. When the screen 7 is with any in-plane non-uniformity being the polarization characteristics, for example, the user may perceive such linear color unevenness as shown in FIG. 4 when the user tilts his/her head.

In order to solve the previous problems of A and B, the polarization-state-changing factor of 1 is expected to be used for a solution. This is because, with the polarization-state-changing factor of 2, there is no way to ask the user (customer) to use the screen 7 of a specific type. With the polarization-state-changing factor of 3, using specifically-designed 3D glasses is not practical considering the recent trend toward standardization of the 3D glasses 2.

For problem solving by the polarization-state-changing factor of 1, the problem of A is solved by the following approaches #1 to #3.

1. Use the projection lens 51 being a lens entirely made of glass, i.e., avoid use of a plastic lens.

However, this indeed solves the problem of A but not the problem of B.

2. When the color synthesis prism 52 is an SPS model, provide a wavelength-selective half waveplate (Color Select) between the projection lens 51 and the color synthesis prism 52. Using the wavelength-selective half waveplate, S-polarized light/P-polarized light/S-polarized light is aligned in order of RGB to have P-polarized light/P-polarized light/P-polarized light, or S-polarized light/S-polarized light/S-polarized light. However, this indeed solves the problem of A but not the problem of B.

As for a color synthesis prism generally used in a projector, an SPS model is more popular than an SSS model because green light is higher in transmittance when it is P-polarized than when it is S-polarized. However, the SSS model is also used for polarization alignment of RGB light after it is emitted from the color synthesis prism.

3. Use the color synthesis prism 52 of an SSS model. However, this indeed solves the problem of A but not the problem of B. Moreover, this considerably reduces the transmittance of G (Green), thereby greatly reducing the 2D brightness.

As such, for solving the problem of A, the approaches #1 to #3 as above are available each as a solution. However, these approaches #1 to #3 do not solve the problem of B. This is because, with the approaches #1 to #3, the RGB light is simply linearly polarized in the same direction, and the light coming from the projector 50 is not put in the non-polarized state (no one has found out that putting the light in this non-polarized state is a solution).

For solving both of the problems A and B, a possible approach is to put the light in the non-polarized state by providing any of the wavelength-selective half waveplate, the uniaxial organic material, and the uniaxial crystal on the light-emission side of the projection lens 51, i.e., on the light-emission stage thereof. This configuration leads to satisfactory results against both of the problems A and B described above.

However, this configuration does not always make 3D images completely free of color unevenness and brightness reduction. This is because, when the polarization patterns of light are affected too much, especially when the projection lens is a plastic lens, for example, the light is not sufficiently put in the non-polarization state. In this case, the resulting 3D images are with slight color unevenness/brightness reduction.

If any of the wavelength-selective half waveplate, the uniaxial organic material, and the uniaxial crystal is provided on the light-emission side of the projection lens 51, the light coming from the projection lens 51 is indeed put in the non-polarized state more sufficiently. However, when the projection lens 51 in use is a plastic lens that greatly affects the polarization patterns of the light, the light coming therefrom is indeed put in the non-polarized state more sufficiently, but is difficult to be in the non-polarized state uniformly in all directions. For these reasons, the 3D images are not completely free of color unevenness and brightness reduction even with the above configuration.

There may be another approach to make thick the uniaxial organic material and the uniaxial crystal. This approach, however, causes a problem of impairing the focusing capability.

In view of the circumstances as described above, it is thus desirable to provide the projection apparatus 1 that considerably improves the quality of 3D images with totally no color unevenness when the 3D glasses 2 are not tilted, and with totally no color unevenness and brightness reduction when the 3D glasses 2 are tilted.

Described next is a transmissive LCD projector, and a reflective LCD projector as application examples of the projection apparatus 1.

Figure 5:
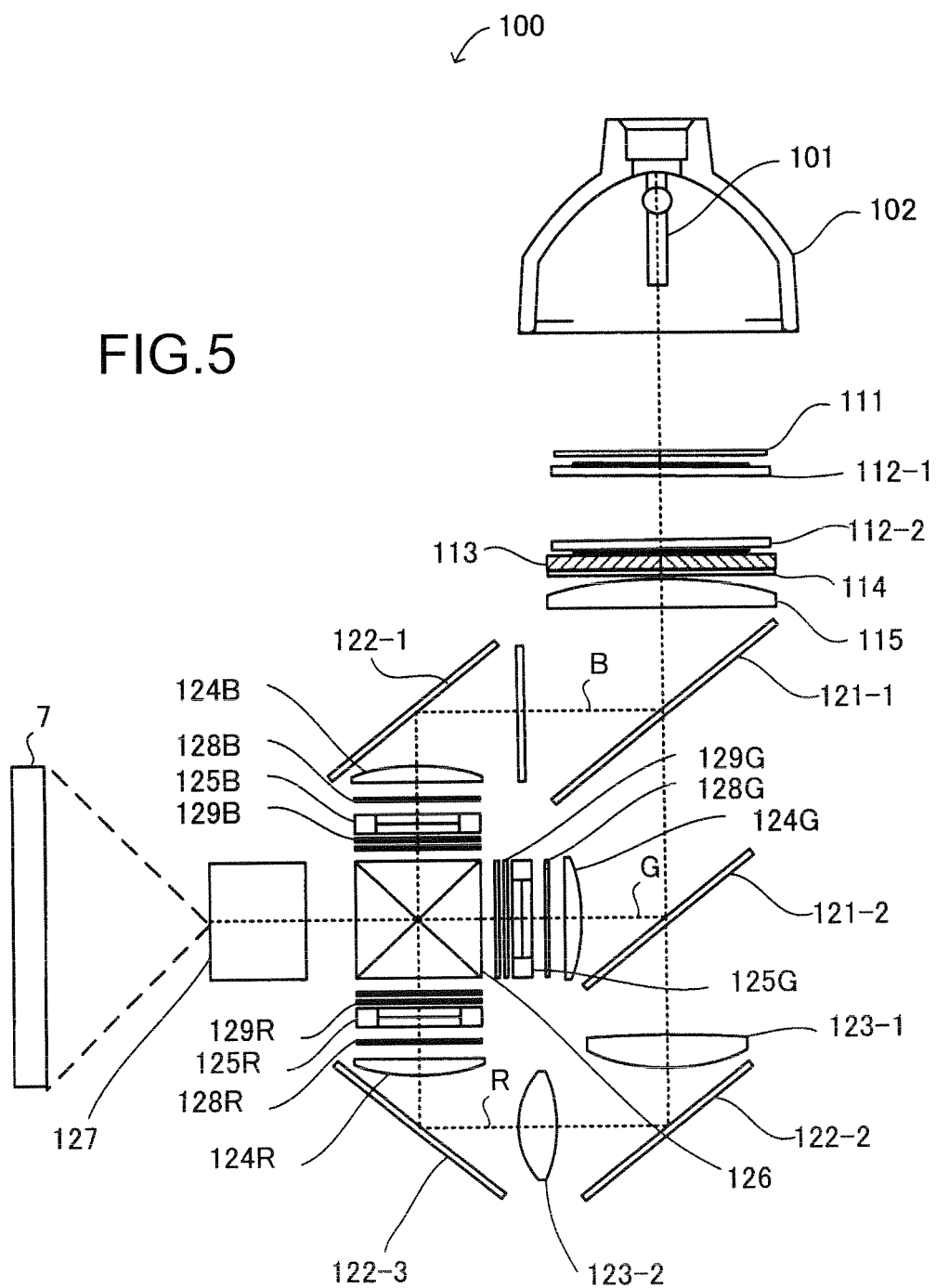
FIG. 5 is a diagram showing an exemplary optical unit configuration of a transmissive LCD projector.

FIG. 5 is a diagram showing an exemplary optical unit configuration of a transmissive LCD projector. A transmissive LCD projector 100 includes a light source section, an illumination optical system, a separation optical system, a light modulation element section, a synthesis optical system, and a projection optical system.

The light source section includes a light source 101, and a reflector 102. The light source 101 is exemplified by an HID (High Intensity Discharge) lamp including an extra-high-pressure mercury lamp, and a metal-halide lamp, for example. The light source 101 emits white light.
The light source 101 is disposed at the focal position of the reflector 102, and generates substantially-parallel light by reflecting the white light coming from the light source 101 on the reflector 102. The reflector 102 is not restrictive to be in the parabolic shape, and may be in the elliptical shape, for example.

The illumination optical system includes a UV (Ultra Violet) cut filter 111, fly-eye lenses 112-1 and 112-2, a polarized-light separation element 113, a waveplate unit (polarized-light modulation element) 114, and a condenser lens 115.

The UV cut filter 111 is provided in front of the light source 101 to block passage of ultraviolet rays coming from the light source 101. The fly-eye lenses 112-1 and 112-2 receive the substantially-parallel light after reflection on the reflector 102, and emits the substantially-parallel light to the polarized-light separation element 113. The fly-eye lenses 112-1 and 112-2 make uniform the illuminance of light entering the light modulation element section.

The polarized-light separation element 113 separates the incoming luminous fluxes into first and second polarization components. That is, the polarized-light separation element 113 receives light being combined light of S- and P-polarized light, and emits the P-polarized light to a first region, and the S-polarized light to a second region, for example.

The waveplate unit 114 aligns the polarization axis of light coming from the polarized-light separation element 113 along a predetermined direction. That is, the waveplate unit 114 modulates the P-polarized light that has entered the first region to the S-polarized light, and aligns the polarization axis thereof along the S-polarized light that has entered the second region, for example.

The condenser lens 115 receives and gathers the light coming from the waveplate unit 114. The white light from the condenser lens 115 enters the separation optical system.

The separation optical system separates the light coming from the condenser lens 115 into RGB (Red, Green, and Blue) light. The separation optical system includes dichroic mirrors 121-1 and 121-2, reflection mirrors 122-1 to 122-3, relay lenses 123-1 and 123-2, and condenser lenses 124R, 124G, and 124B.

The dichroic mirrors 121-1 and 121-2 selectively transmit or reflect each of the RGB light based on the wavelength range thereof. The dichroic mirror 121-1 transmits the light G and R respectively in the green and red wavelength ranges, and reflects the light B in the blue wavelength range.

The dichroic mirror 121-2 transmits the light R in the red wavelength range, and reflects the light G in the green wavelength range. With such dichroic mirrors 121-1 and 121-2, the white light is separated into light in three colors of RGB. These dichroic mirrors are available for light separation irrespective of which color, i.e., red or blue.

The reflection mirror 122-1 is a total reflection mirror, and reflects the light B in the blue wavelength range after separation by the dichroic mirror 121-1, and guides the light B to a light modulation element 125B. The reflection mirrors 122-2 and 122-3 are also each a total reflection mirror, and reflect the light R in the red wavelength range after separation by the dichroic mirror 121-2, and guide the light R to a light modulation element 125R.

The relay lenses 123-1 and 123-2 alter the optical path length for the light R in the red wavelength range. The condenser lenses 124R, 124G, and 124B converge the light R, G, and B in the red, green, and blue wavelength ranges, respectively.

The light coming from such a separation optical system, i.e., the light R, G, and B in the red, green, and blue wavelength ranges, is directed to the light modulation elements 125R, 125G, and 125B, respectively.

In front of the light modulation elements 125R, 125G, and 125B, i.e., on the light source side, incident-side polarization plates 128R, 128G, and 128B are respectively provided. These incident-side polarization plates 128R, 128G, and 128B respectively align the polarization components of the light R, G, and B in the red, green, and blue wavelength ranges provided by the separation optical system.

The light modulation elements 125R, 125G, and 125B subject, to spatial modulation, the light R, G, and B in the red, green, and blue wavelength ranges. Emission-side polarization plates 129R, 129G, and 129B each transmit a predetermined polarization component of the spatially-modulated light.

The synthesis optical system includes a color synthesis prism 126. The color synthesis prism 126 transmits the light G in the green wavelength range, and reflects the light R and B respectively in the red and blue wavelength ranges toward the projection optical system.

The color synthesis prism 126 is a joint combination of a plurality of glass prisms, i.e., four isosceles right prisms substantially in the same shape, for example. On the surfaces where the glass prisms are combined together, two interference filters having predetermined optical characteristics are formed.

The first interference filter reflects the light B in the blue wavelength range, and transmits the light R and G respectively in the red and green wavelength ranges.

The second interference filter reflects the light R in the red wavelength range, and transmits the light G and B respectively in the green and blue wavelength ranges.

As such, after modulation by the light modulation elements 125R, 125G, and 125B, the resulting RGB light is combined together in the color synthesis prism 126, and then is directed to the projection optical system.

A projection lens 127 being the projection optical system magnifies the light from the color synthesis prism 126 up to a predetermined magnification for video projection on the screen 7.

Figure 6:
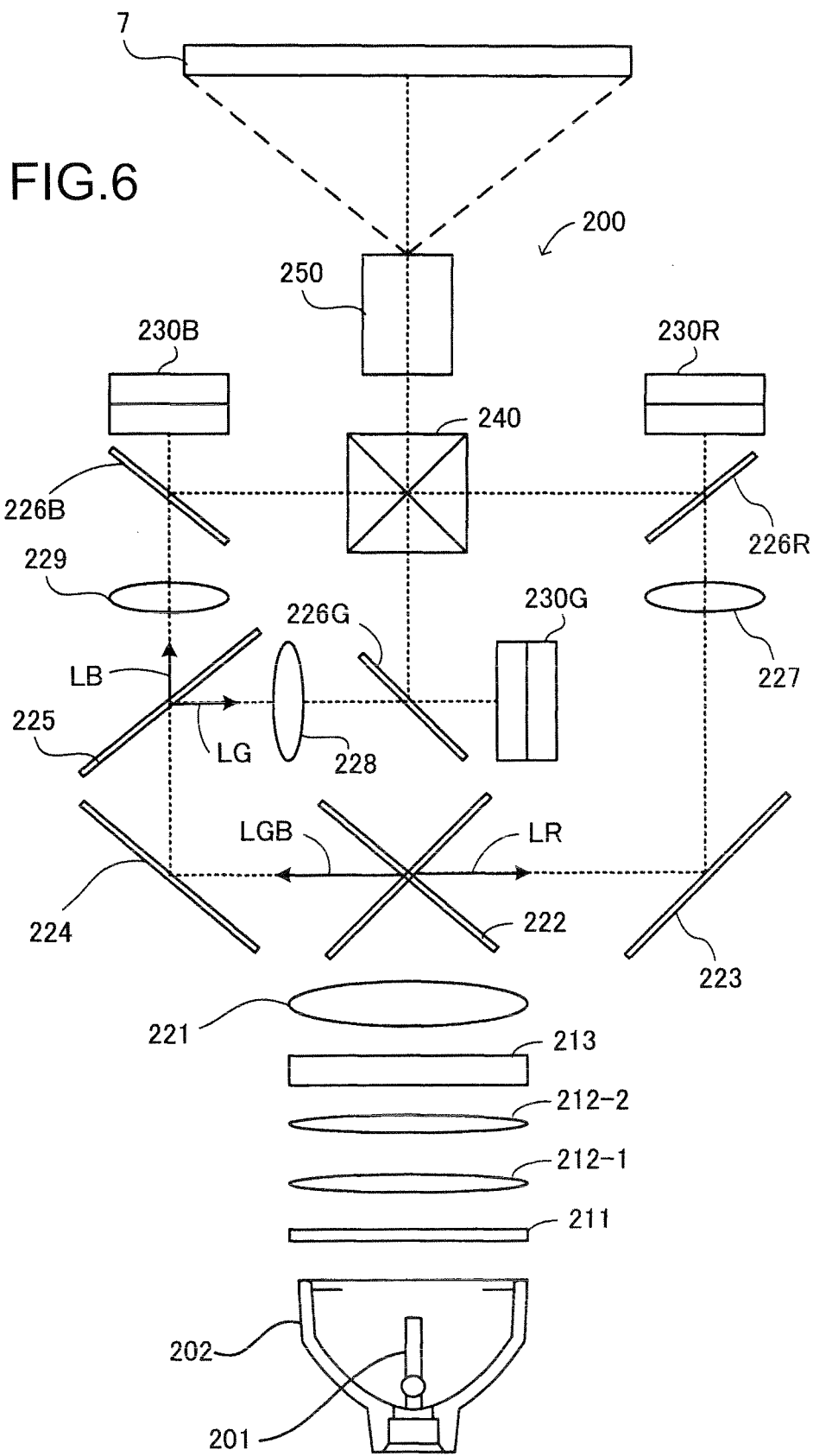
FIG. 6 is a diagram showing an exemplary optical unit configuration of a reflective LCD projector.

FIG. 6 is a diagram showing an exemplary optical unit configuration of a reflective LCD projector. In a reflective LCD projector 200, a light source 201 is disposed at the focal position of a reflector 202, and generates substantially-parallel light by reflecting white light coming from the light source 201 on the reflector 202.

A UV/IR (Ultra Violet/Infrared Rays) cut filter 211 receives the substantially-parallel light, and blocks passage of ultraviolet rays and infrared rays. Herein, the reflector 202 is not restrictive to be in the parabolic shape, and may be in the elliptical shape, for example.

Fly-eye lenses 212-1 and 212-2 make uniform the illuminance of light, and a PS converter (polarization conversion element) 213 aligns the randomly polarized light, i.e., P-polarized light/S-polarized light, to be directed along one polarization direction. A main condenser lens 221 gathers the white illumination light whose polarization direction is uniformly aligned by the PS converter 213.

A dichroic mirror 222 separates the white illumination light into light LR in the red wavelength range, and light LGB in the green and blue wavelength ranges. This dichroic mirror 222 is available for light separation irrespective of which color, i.e., red or blue is separated. A reflection mirror 223 reflects the red light LR after separation by the dichroic mirror 222.

Another reflection mirror 224 reflects the green and blue light LGB after separation by the dichroic mirror 222. As for the light LGB after reflection by the reflection mirror 224, a dichroic mirror 225 reflects only the light in the green wavelength range, and transmits the remaining light in the blue wavelength range.

A polarization plate 226R transmits the red light LR, i.e., the P-polarized light, after reflection on the reflection mirror 223, and then directs the red light LR to a reflective liquid crystal panel 230R. The reflective liquid crystal panel 230R then subjects the red light LR to spatial modulation, and directs the resulting S-polarized red light to a color synthesis prism 240 by reflection. As an alternative configuration, the color synthesis prism 240 may be provided with a polarization plate on each surface where the RGB light enters.

When the color synthesis prism 240 in use is an SSS model, the green light enters the color synthesis prism 240 as it is. When the color synthesis prism 240 is an SPS model, a half waveplate is provided on the light-incident side thereof, and the green light is P-polarized and then enters the color synthesis prism 240.

A polarization plate 226G transmits the green light LG, i.e., the P-polarized light, after reflection on the dichroic mirror 225, and then directs the green light LG to a reflective liquid crystal panel 230G. The reflective liquid crystal panel 230G then subjects the green light LG to spatial modulation, and directs the resulting S-polarized green light to the color synthesis prism 240 by reflection.

A polarization plate 226B transmits the blue light LB, i.e., the P-polarized light, after transmission through the dichroic mirror 225, and then directs the blue light LB to a reflective liquid crystal panel 230B. The reflective liquid crystal panel 230B then subjects the blue light LB to spatial modulation, and directs the resulting S-polarized blue light to the color synthesis prism 240 by reflection.

On the light-incident side of each of the polarization plates 226R, 226G, and 226B, optical lenses 227 to 229 are respectively provided (a polarization plate may also be provided between the optical lens 228 and the polarization plate 226G).

As for the white light coming from the light source 201, the illuminance thereof is made uniform by the fly-eye lenses 212-1 and 212-2, and the resulting light is aligned by the PS converter 213 to be directed along a predetermined polarization direction. The output light is then oriented by the main condenser lens 221 to illuminate the reflective liquid crystal panels 230R, 230G, and 230B. After being oriented as such, the light is then separated into light in three different wavelength ranges by the dichroic mirrors 222, 225, and others each serving as a color serration mirror.

After the separation, the resulting color light enters a reflective polarization plate, and only light in one specific polarization direction is selected by the polarization plates 226R, 226G, and 226B before entering the reflective liquid crystal panels 230R, 230G, and 230B. As such, the RGB light enters the reflective liquid crystal panels 230R, 230G, and 230B.

The reflective liquid crystal panels 230R, 230G, and 230B are each applied with a video signal corresponding to the color of incoming light. In accordance with the video signals, the reflective liquid crystal panels 230R, 230G, and 230B rotate the incoming light to change the polarization direction thereof. The resulting light is then modulated and output. The modulated light coming from these liquid crystal panels enters again the polarization plates 226R, 226G, and 226B.

From the polarized light in the polarization plates 226R, 226G, and 226B, only any 90-degree rotated polarized components are selected, and then are directed to the color synthesis prism 240. In the color synthesis prism 240, each color light after modulation by the three reflective liquid crystal panels is combined together to align along the same and then emitted. The resulting light from the color synthesis prism 240 is then directed by the projection lens 250 for output on the screen 7.

Described next is the polarization conversion section 20 in the projection apparatus 1. The polarization conversion section 20 is any one of a wavelength-selective half waveplate, a uniaxial organic material, and a uniaxial crystal. In the below description, their characteristics are described.

Figure 7:
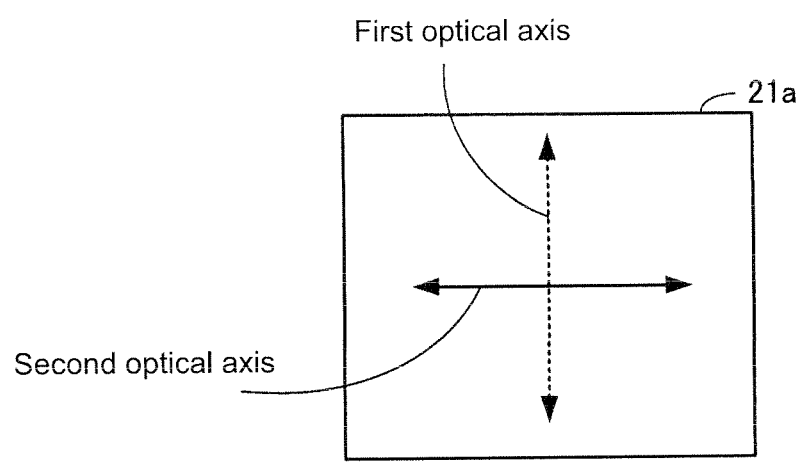
FIG. 7 is a diagram showing a wavelength-selective half waveplate.

FIG. 7 is a diagram showing a wavelength-selective half waveplate. A wavelength-selective half waveplate 21a includes a first optical axis, and a second optical axis orthogonal to the first optical axis. The wavelength-selective half waveplate 21a has the characteristics of producing a phase shift of $\pi$ with respect to light with a predetermined wavelength by a change of oscillation direction of the light from horizontal oscillation to vertical oscillation, and vice versa.

FIG. 8 is a diagram for illustrating the characteristics of the wavelength-selective half waveplate. When a linearly-polarized light beam enters the wavelength-selective half waveplate 21a with the oscillation direction thereof being parallel to the first optical axis, i.e., at the angle of 0° or π, a phase shift of π occurs, and the light beam is changed in direction to be parallel to the second optical axis and then emitted.

Conversely, when a linearly-polarized light beam enters the wavelength-selective half waveplate 21a with the oscillation direction thereof being parallel to the second optical axis, i.e., at the angle of 0° or π, a phase shift of π occurs, and the light beam is changed in direction to be parallel to the first optical axis and then emitted.

When the projection apparatus 1 uses such a wavelength-selective half waveplate 21a, instead of directing a light beam parallel to the first and second axes to the wavelength-selective half waveplate 21a, desirably, a light beam not parallel to the first and second optical axes, e.g., a linearly-polarized, circularly-polarized, or elliptically-polarized light beam is directed thereto.

That is, the light coming from the wavelength-selective half waveplate 21a becomes more like "light polarized differently on a wavelength basis" as the color light in the combined light coming from the color synthesis section 10 loses the parallel relationship with the first and second optical axes of the wavelength-selective half waveplate 21a, and the light is put in the non-polarized state.

As such, by the polarized light whose oscillation direction is not parallel to the first and second optical axes passing through the wavelength-selective half waveplate 21a, the light coming from the color synthesis section 10 is polarized differently on a wavelength basis by the wavelength-selective half waveplate 21a, and is put in the non-polarized state.

As described above, with the use of the wavelength-selective half waveplate 21a, the polarized light coming therefrom becomes more like "light polarized differently on a wavelength basis" as the polarized light entering thereinto loses its linearity along the first and second optical axes, e.g., circularly-polarized light, elliptically-polarized light, and linearly-polarized light being the result of rotation from the direction of the first and second optical axes. Note that the wavelength-selective half waveplate is not the only option, and any other optical member may be used as long as it has the characteristics of producing "light polarized differently on a wavelength basis".

The wavelength-selective half waveplate 21a has advantages of offering the wide range of placement to the first and second optical axes because the light entering thereinto is only expected not to be linear along the first and second optical axes. Moreover, in the light-incident stage of the wavelength-selective half waveplate 21a, the polarization direction (rotation direction) of the light is not expected to be aligned in advance.

FIG. 9 is a diagram showing a uniaxial organic material and a uniaxial crystal. A uniaxial organic material 21b is an organic material having one optical axis, and is exemplified by a large-phase retardation plate. Such a uniaxial organic material 21b causes phase retardation of 10000 nm or more to light entering thereinto.

The uniaxial crystal 21c is a crystal having one optical axis, and is exemplified by quartz crystal (quartz), sapphire, calcite, and magnesium fluoride. Such a uniaxial crystal 21c causes phase retardation of about 10000 nm to light entering thereinto (about 1 mm with quartz). The uniaxial organic material 21b and the uniaxial crystal 21c each have a slow axis at an angle of 45°.

FIG. 10 is a diagram for illustrating the characteristics of the uniaxial organic material, and those of the uniaxial crystal. With the characteristics of the uniaxial organic material 21b, and with those of the uniaxial crystal 21c, the index of refraction affects more on incoming light whose oscillation direction is the same as the slow axis of FIG. 10, but affects less on incoming light whose oscillation direction is different from the slow axis.

As such, when incoming polarized light oscillates (rotates) in the direction of 45° against the slow axis, the outgoing light is in the non-polarized state. When the incoming polarized light oscillates in the direction of 0° or 90° against the slow axis, the outgoing light shows no change as the phase of the incoming polarized light.

On the other hand, when the incoming polarized light oscillates in any other direction with respect to the slow axis, the outgoing polarized light has the polarization patterns greatly affected thereby, and thus the state thereof is not even close to the non-polarized state.

When the projection apparatus 1 uses the uniaxial organic material 21b or the uniaxial crystal 21c, desirably, a light beam directed thereto is a linearly-polarized, circularly-polarized, or elliptically-polarized light beam oscillating in the direction of 45° against the slow axis.

As such, by the polarized light whose oscillation direction is at an angle of against the slow axis passing through the uniaxial organic material 21b or the uniaxial crystal 21c, the color light in the combined light coming from the color synthesis section 10 is polarized differently on a wavelength basis by the uniaxial organic material 21b or the uniaxial crystal 21c, and is put in the non-polarized state.

The uniaxial organic material 21b and the uniaxial crystal 21c serve best when the light right after emission from the color synthesis section 10 is uniformly polarized. Between these two, the uniaxial crystal 21c (especially crystal) has the characteristics as described below so that using the uniaxial crystal 21c as the polarization conversion section 20 produces a good effect.

A1. Less expensive compared with the wavelength-selective half waveplate 21a and the uniaxial organic material 21b.

A2. High physical strength and high reliability as is an optical glass.

A3. Constant focusing capability even if it is placed between the LCD and the projection lens as is not an organic material such as sheet/film.

Figure 11:
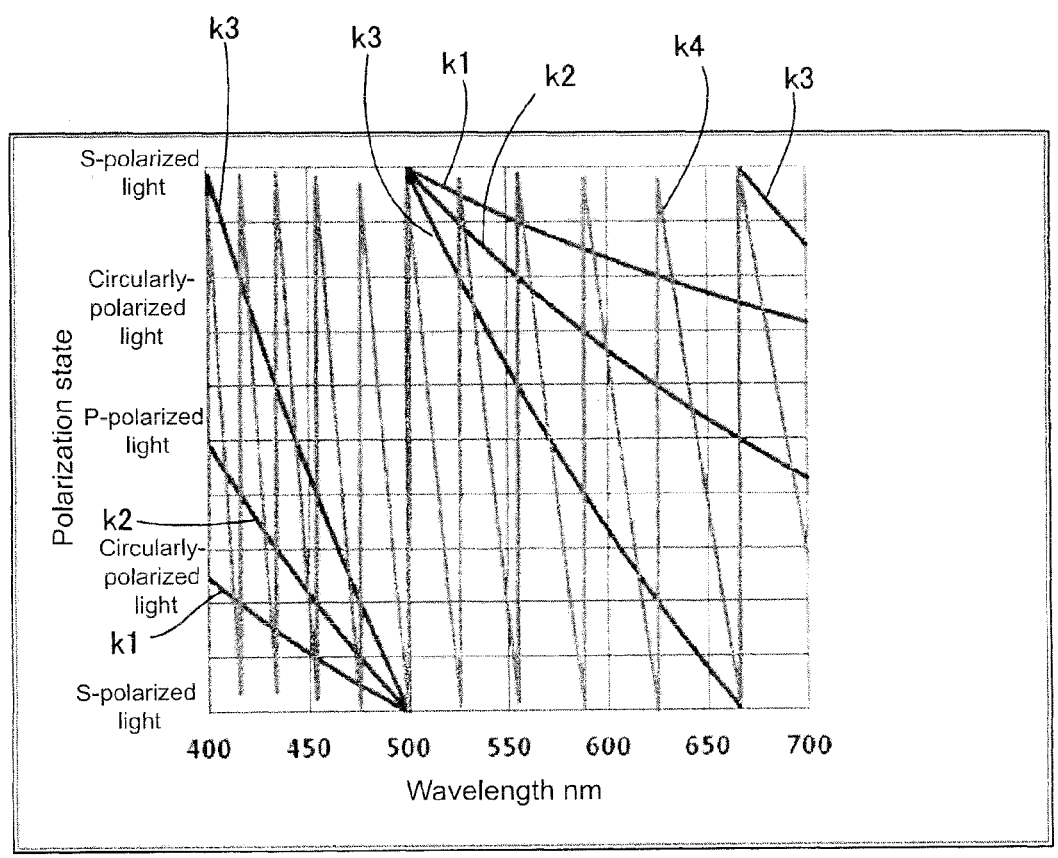
FIG. 11 is a diagram showing the polarization state of light affected by phase retardation of the uniaxial organic material and that of the uniaxial crystal.

Described next is the polarization state of light affected by phase retardation of the uniaxial organic material 21b and that of the uniaxial crystal 21c. FIG. 11 is a diagram showing the polarization state of light affected by phase retardation of the uniaxial organic material and that of the uniaxial crystal. The vertical axis indicates the polarization state of light, and the horizontal axis indicates the wavelength (nm). In FIG. 11, a curve k1 is with phase retardation of 500 nm, a curve k2 is with phase retardation of 1000 nm, a curve k3 is with phase retardation of 2000 nm, and a curve k4 (jagged line) is with phase retardation of 10000 nm.

Exemplified herein is a case where the phase retardation is large, e.g., 10000 nm, with the slow axis of 45° against incoming linearly-polarized light, which corresponds to the jagged line in the drawing. Assuming that linearly-polarized light with a certain wavelength, e.g., 550 nm, passes through the slow axis, light with an adjacent wavelength, e.g., 501 nm, is polarized elliptically (almost linearly).

As such, combining the light polarized differently in the wavelength range in use (about 430 to 700 nm) produces light polarized differently on a wavelength basis so that the non-polarized state is created.

Accordingly, when the polarization conversion section 20 in use is the uniaxial organic material 21b or the uniaxial crystal 21c, if the conditions are satisfied, i.e., the slow axis is at an angle of 45° and the phase retardation is large, the light is largely polarized with a change of wavelength so that the light becomes more uniform in the resulting non-polarized state.

Moreover, when the polarized light is linearly-polarized/elliptically-polarized/circularly-polarized light in the S and P directions, the uniaxial organic material 21b or the uniaxial crystal 21c serves especially useful because it creates "light polarized differently on a wavelength basis" irrespective of the type of the light. What is more, in the light-incident stage of the uniaxial organic material 21b or the uniaxial crystal 21c, the polarization direction (rotation direction) of the light is not expected to be aligned in advance.

Figure 12:
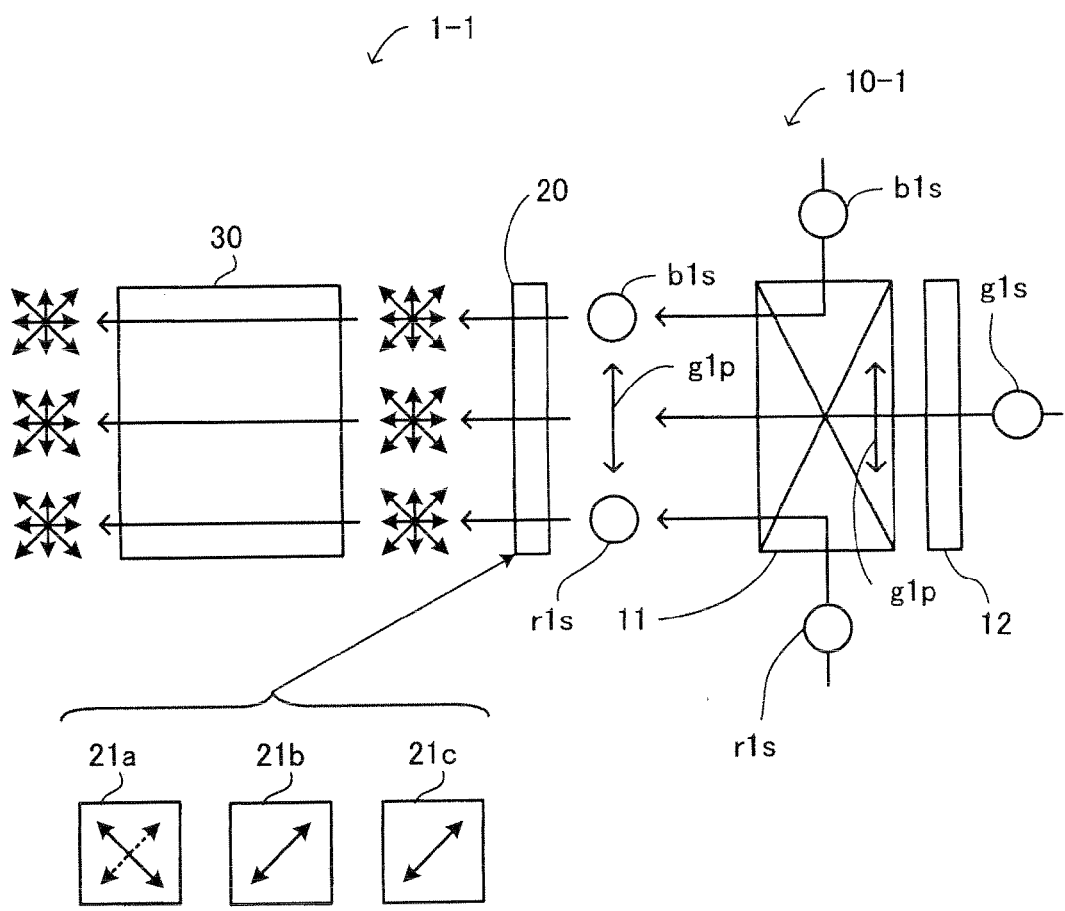
FIG. 12 is a diagram showing an exemplary configuration of a projection apparatus.

By referring to FIGS. 12 to 16, described next are various manners to perform the polarization conversion process in the projection apparatus 1, i.e., various placement patterns of optical members. FIG. 12 is a diagram showing an exemplary configuration of a projection apparatus. A projection apparatus 1-1 includes a color synthesis section 10-1, the polarization conversion section 20, and the projection lens 30.

The color synthesis section 10-1 includes a color synthesis prism 11, and a half waveplate 12. The polarization conversion section 20 is any of the wavelength-selective half waveplate 21a, the uniaxial organic material 21b, and the uniaxial crystal 21c described above by referring to FIGS. 7 to 11.

The half waveplate 12 is disposed on the light-incident side of the SPS-model color synthesis prism 11 where green light enters. The half waveplate 12 performs polarization conversion on S-polarized green light g1s so that green P-polarized light g1p is generated. Herein, the half waveplate generally basically functions to produce optical-path retardation of a half wavelength (phase retardation $\delta=180°+N \times 360°$) between two linear polarized light (transverse and vertical components) when light passes therethrough. The half waveplate is used mainly for rotating the plane of polarization at a predetermined angle (N=1, 2, 3, and others).

The color synthesis prism 11 generates light being combined light of red S-polarized light r1s, the green P-polarized light g1p, and blue S-polarized light b1s. The red S-polarized light r1s is S-polarized red light, and the blue S-polarized light b1s is S-polarized blue light.

The polarization conversion section 20 puts the light emitted from the color synthesis prism 11, i.e., the red S-polarized light r1s, the green P-polarized light g1p, and the blue S-polarized light b1s, in the non-polarized state uniformly in all directions.

The projection lens 30 receives the combined light provided by the polarization conversion section 20, and then magnifies the combined light up to a predetermined magnification for emission. In the combined light, the color light is all in the non-polarized state. Thereafter, the light in the non-polarized state uniformly in all directions is directed onto the screen.

When the wavelength-selective half waveplate 21a is used as the polarization conversion section 20, the wavelength-selective half waveplate 21a is disposed on the light-emission side of the color synthesis prism 11 such that the first optical axis forms an angle of 45° against the incoming polarized light, and the second optical axis forms an angle of 135° thereagainst. Alternatively, the wavelength-selective half waveplate 21a may be so disposed that the first optical axis forms an angle of 135° against the incoming polarized light, and the second optical axis forms an angle of 45° thereagainst.

When the uniaxial organic material 21b or the uniaxial crystal 21c is used as the polarization conversion section 20, the uniaxial organic material 21b or the uniaxial crystal 21c is disposed on the light-emission side of the color synthesis prism 11 such that the slow axis forms an angle of 45° or 135° against the incoming polarized light.

With the projection apparatus 1-1 configured as above, the light directed to the screen and the light reflected thereon is in the non-polarized state uniformly in all directions. This accordingly considerably improves the quality of 3D images with totally no color unevenness when 3D glasses are not tilted, and with totally no color unevenness and brightness reduction when the 3D glasses are tilted.

Figure 13:
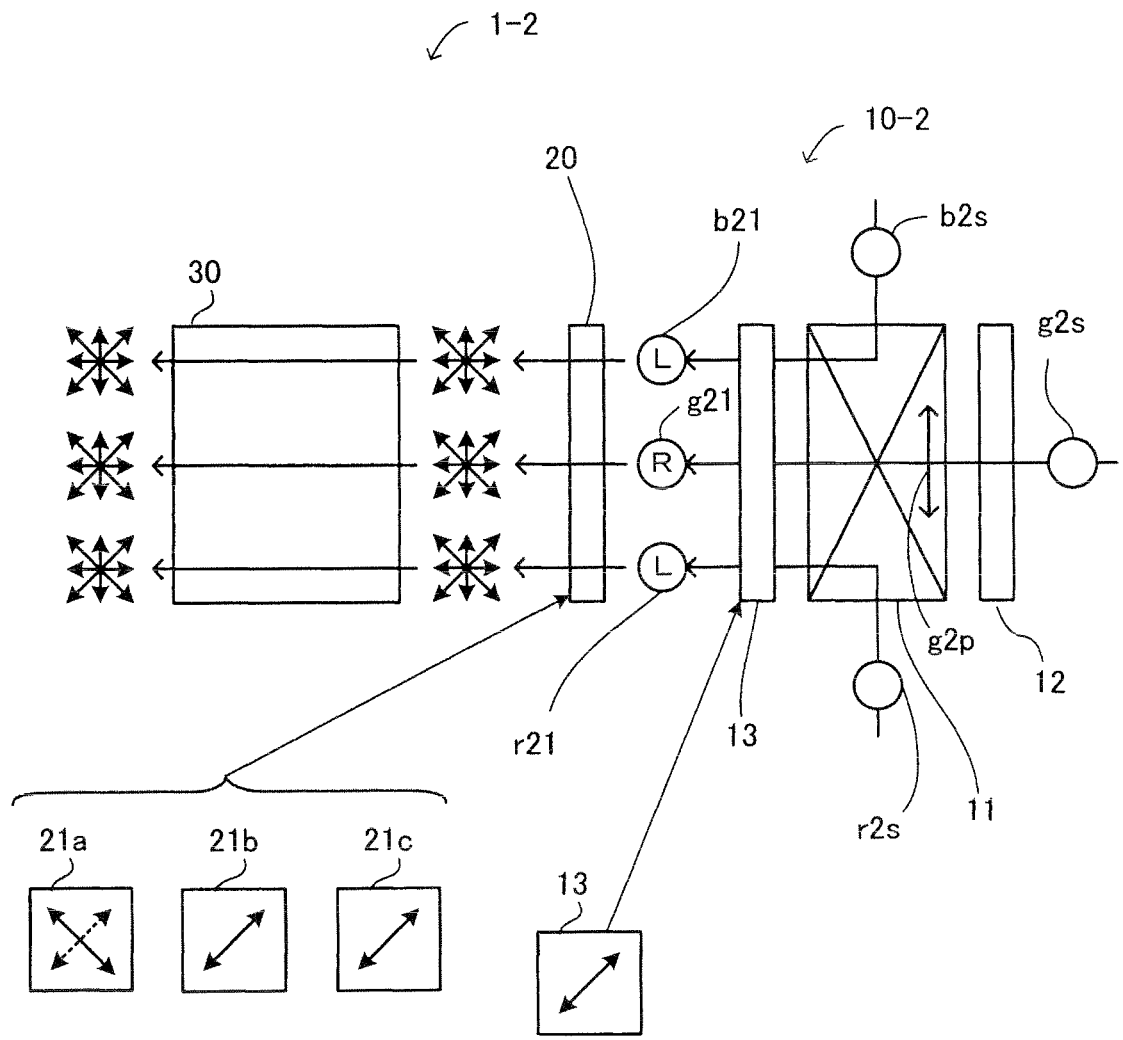
FIG. 13 is a diagram showing another exemplary configuration of the projection apparatus.

FIG. 13 is a diagram showing an exemplary configuration of a projection apparatus. A projection apparatus 1-2 includes a color synthesis section 10-2, the polarization conversion section 20, and the projection lens 30.

The color synthesis section 10-2 includes the color synthesis prism 11, the half waveplate 12, and a quarter waveplate 13. The polarization conversion section 20 uses any of the wavelength-selective half waveplate 21a, the uniaxial organic material 21b, and the uniaxial crystal 21c described above by referring to FIGS. 7 to 11.

The half waveplate 12 is disposed on the light-incident side of the SPS-model color synthesis prism 11 where green light enters. The half waveplate 12 performs polarization conversion on S-polarized green light g2s so that green P-polarized light g2p is generated. The color synthesis prism 11 generates light being combined light of red S-polarized light r2s, the green P-polarized light g2p, and blue S-polarized light b2s. The red S-polarized light r2s is S-polarized red light, and the blue S-polarized light b2s is S-polarized blue light.

The quarter waveplate 13 is disposed on the light-emission side of the color synthesis prism 11, and is so oriented that the optical axis forms an angle of 45° against incoming polarized light. The quarter waveplate 13 converts the red S-polarized light r2s into left-handed circularly-polarized light, i.e., red left-handed circularly-polarized light r21, the green P-polarized light g2p into right-handed circularly-polarized light, i.e., green right-handed circularly-polarized light g21, and the blue S-polarized light b2s into left-handed circularly-polarized light, i.e., blue left-handed circularly-polarized light b21.

Herein, the quarter waveplate generally basically functions to produce optical-path retardation of a quarter wavelength (phase retardation $\delta=90°+N \times 360°$) between two linear polarized light (transverse and vertical components) when light passes therethrough. The quarter waveplate is often used mainly for converting linearly-polarized light into circularly-polarized light, or conversely, converting circularly-polarized light into linearly-polarized light (N=1, 2, 3, and others).

The concern here is that, when light from the color synthesis prism 11 enters the projection lens 30, the light reflected on the projection lens 30 may return back to the color synthesis prism 11. If this is the case, this may generate stray light, and may cause a ghost phenomenon or others on the screen.

Therefore, in the description above, the quarter waveplate 13 as described above is provided for prevention of stray light between the light-emission stage of the color synthesis prism 11 and the light-incident stage of the polarization conversion section 20.

On the other hand, the polarization conversion section 20 puts the light emitted from the quarter waveplate 13, i.e., the red left-hand circularly-polarized light r21, the green right-handed circularly-polarized light g21, and the blue left-handed circularly-polarized light b21, in the non-polarized state uniformly in all directions.

The projection lens 30 receives the combined light provided by the polarization conversion section 20, and then magnifies the combined light up to a predetermined magnification for emission. In the combined light, the color light is all in the non-polarized state. Thereafter, the light in the non-polarized state uniformly in all directions is directed onto the screen.

When the wavelength-selective half waveplate 21a is used as the polarization conversion section 20, the wavelength-selective half waveplate 21a is disposed on the light-emission side of the color synthesis prism 11 such that the first optical axis forms an angle of 45° against the incoming polarized light, and the second optical axis forms an angle of 135° thereagainst. Alternatively, the wavelength-selective half waveplate 21a may be so disposed that the first optical axis forms an angle of 135° against the incoming polarized light, and the second optical axis forms an angle of 45° thereagainst.

When the uniaxial organic material 21b or the uniaxial crystal 21c is used as the polarized conversion section 20, the uniaxial organic material 21b or the uniaxial crystal 21c is disposed on the light-emission side of the color synthesis prism 11 such that the slow axis forms an angle of 45° or 135° against the incoming polarized light.

With the projection apparatus 1-2 configured as above, the light directed to the screen and the light reflected thereon is in the non-polarized state uniformly in all directions. This accordingly considerably improves the quality of 3D images with totally no color unevenness when 3D glasses are not tilted, and with totally no color unevenness and brightness reduction when the 3D glasses are tilted.

Figure 14:
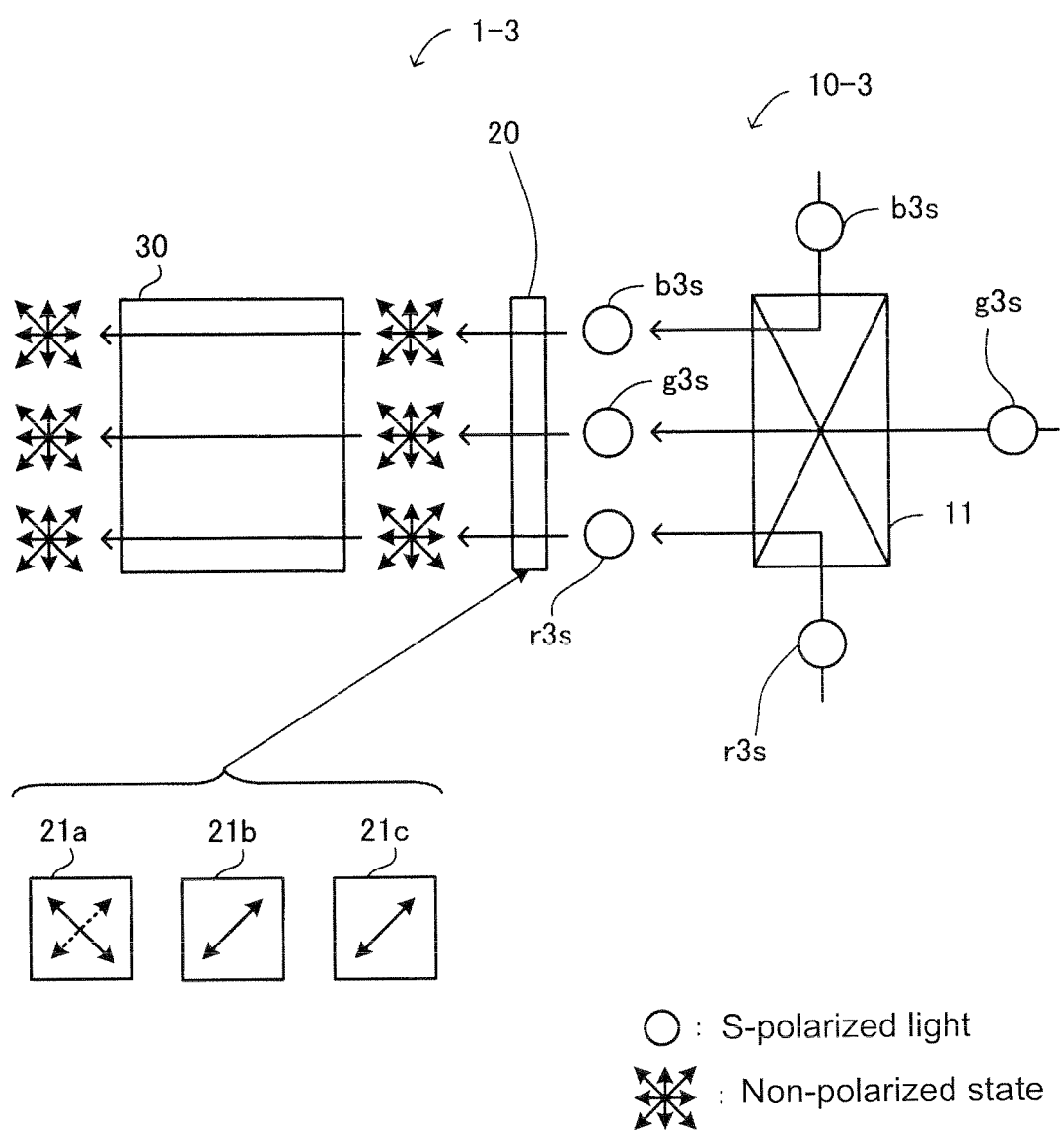
FIG. 14 is a diagram showing still another exemplary configuration of the projection apparatus.

FIG. 14 is a diagram showing an exemplary configuration of a projection apparatus. A projection apparatus 1-3 includes a color synthesis section 10-3, the polarization conversion section 20, and the projection lens 30. The polarization conversion section 20 uses of the wavelength-selective half waveplate 21a, the uniaxial organic material 21b, and the uniaxial crystal 21c described above by referring to FIGS. 7 to 11.

The SSS-model color synthesis prism 11 generates light being combined light of red S-polarized light r3s, green S-polarized light g3s, and blue S-polarized light b3s. The red S-polarized light r3s is S-polarized red light, the green S-polarized light g3s is S-polarized green light, and the blue S-polarized light b3s is S-polarized blue light.

The polarization conversion section 20 puts the light emitted from the color synthesis prism 11, i.e., the red S-polarized light r3s, the green S-polarized light g3s, and the blue S-polarized light b3s, in the non-polarized state uniformly in all directions.

The projection lens 30 receives the combined light provided by the polarization conversion section 20, and then magnifies the combined light up to a predetermined magnification for emission. In the combined light, the color light is all in the non-polarized state. Thereafter, the light in the non-polarized state uniformly in all directions is directed onto the screen.

When the wavelength-selective half waveplate 21a is used as the polarization conversion section 20, the wavelength-selective half waveplate 21a is disposed on the light-emission side of the color synthesis prism 11 such that the first optical axis forms an angle of 45° against the incoming polarized light, and the second optical axis forms an angle of 135° thereagainst. Alternatively, the wavelength-selective half waveplate 21a may be so disposed that the first optical axis forms an angle of 135° against the incoming polarized light, and the second optical axis forms an angle of 45° thereagainst.

When the uniaxial organic material 21b or the uniaxial crystal 21c is used as the polarized conversion section 20, the uniaxial organic material 21b or the uniaxial crystal 21c is disposed on the light-emission side of the color synthesis prism 11 such that the slow axis forms an angle of 45° or 135° against the incoming polarized light.

With the projection apparatus 1-3 configured as above, the light directed to the screen and the light reflected thereon is in the non-polarized state uniformly in all directions. This accordingly considerably improves the quality of 3D images with totally no color unevenness when 3D glasses are not tilted, and with totally no color unevenness and brightness reduction when the 3D glasses are tilted.

Figure 15:
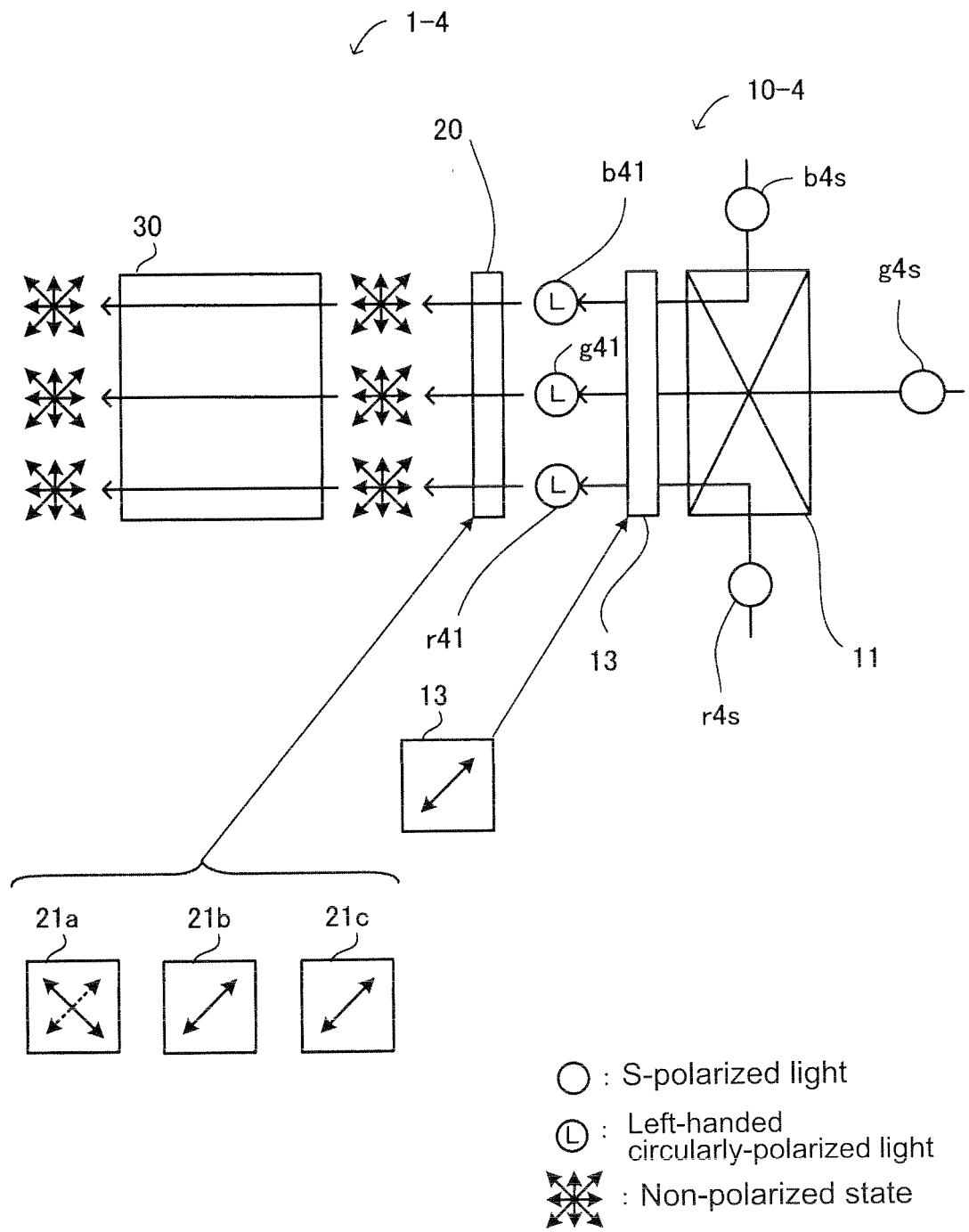
FIG. 15 is a diagram showing still another exemplary configuration of the projection apparatus.

FIG. 15 is a diagram showing an exemplary configuration of a projection apparatus. A projection apparatus 1-4 includes a color synthesis section 10-4, the polarization conversion section 20, and the projection lens 30.

The color synthesis section 10-4 includes the color synthesis prism 11, and the quarter waveplate 13. The polarization conversion section 20 is any of the wavelength-selective half waveplate 21a, the uniaxial organic material 21b, and the uniaxial crystal 21c described above by referring to FIGS. 7 to 11.

The SSS-model color synthesis prism 11 generates light being combined light of red S-polarized light r4s, green S-polarized light g4s, and blue S-polarized light b4s. The red S-polarized light r4s is S-polarized red light, the green S-polarized light g4s is S-polarized green light, and the blue S-polarized light b4s is S-polarized blue light.

For prevention of the stray light described above, the quarter waveplate 13 is disposed on the light-emission side of the color synthesis prism 11, and is so oriented that the optical axis forms an angle of 45° against incoming polarized light. The quarter waveplate 13 converts the red S-polarized light r4s into left-handed circularly-polarized light, i.e., red left-handed circularly-polarized light r41, the green S-polarized light g4s into left-handed circularly-polarized light, i.e., green left-handed circularly-polarized light g41, and the blue S-polarized light b4s into left-handed circularly-polarized light, i.e., blue left-handed circularly-polarized light b41.

The polarization conversion section 20 puts the light emitted from the quarter waveplate 13, i.e., the red left-handed circularly-polarized light r41, the green left-handed circularly-polarized light g41, and the blue left-handed circularly-polarized light b41, in the non-polarized state uniformly in all directions.

The projection lens 30 receives the combined light provided by the polarization conversion section 20, and then magnifies the combined light up to a predetermined magnification for emission. In the combined light, the color light is all in the non-polarized state. Thereafter, the light in the non-polarized state uniformly in all directions is directed onto the screen.

When the wavelength-selective half waveplate 21a is used as the polarization conversion section 20, the wavelength-selective half waveplate 21a is disposed on the light-emission side of the color synthesis prism 11 such that the first optical axis forms an angle of 45° against the incoming polarized light, and the second optical axis forms an angle of 135° thereagainst. Alternatively, the wavelength-selective half waveplate 21*a* may be so disposed that the first optical axis forms an angle of 135° against the incoming polarized light, and the second optical axis form an angle of 45° thereagainst.

When the uniaxial organic material 21*b* or the uniaxial crystal 21*c* is used as the polarized conversion section 20, the uniaxial organic material 21*b* or the uniaxial crystal 21*c* is disposed on the light-emission side of the color synthesis prism 11 such that the slow axis forms an angle of 45° or 135° against the incoming polarized light.

With the projection apparatus 1-4 configured as above, the light directed to the screen and the light reflected thereon is in the non-polarized state uniformly in all directions. This accordingly considerably improves the quality of 3D images with totally no color unevenness when 3D glasses are not tilted, and with totally no color unevenness and brightness reduction when the 3D glasses are tilted.

Figure 16:
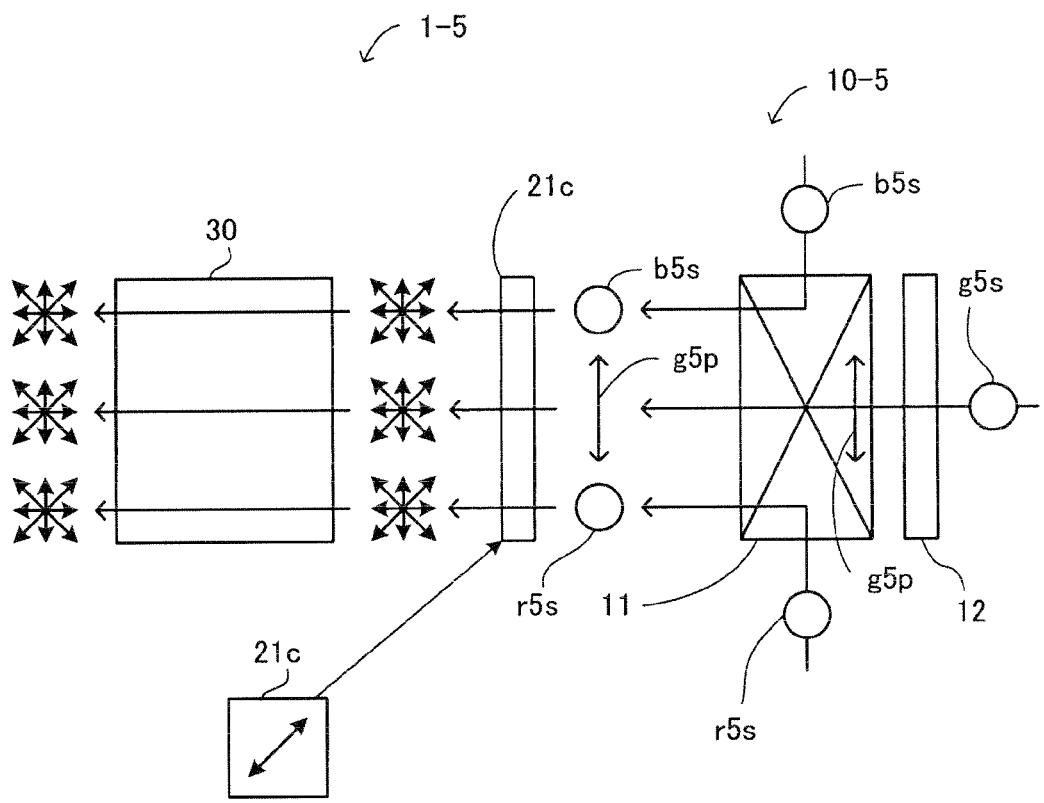
FIG. 16 is a diagram showing still another exemplary configuration of the projection apparatus.

FIG. 16 is a diagram showing an exemplary configuration of a projection apparatus. A projection apparatus 1-5 includes a color synthesis section 10-5, the uniaxial crystal 21*c*, and the projection lens 30.

The color synthesis section 10-5 includes the color synthesis prism 11 and the half waveplate 12. In the example of FIG. 16, the polarization conversion section in use is the uniaxial crystal 21*c* (crystal) described above by referring to FIGS. 9 to 11.

The half waveplate 12 is disposed on the light-incident side of the SPS-model color synthesis prism 11 where green light enters. The half waveplate 12 performs P-polarization conversion on S-polarized green light g5*s* so that green P-polarized light g5*p* is generated. The color synthesis prism 11 generates light being combined light of red S-polarized light r5*s*, the green P-polarized light g5*p*, and blue S-polarized light b5*s*. The red S-polarized light r5*s* is S-polarized red light, and the blue S-polarized light b5*s* is S-polarized blue light.

The uniaxial crystal 21*c* puts the light emitted from the color synthesis prism 11, i.e., the red S-polarized light r5*s*, the green P-polarized light g5*p*, and the blue S-polarized light b5*s*, in the non-polarized state uniformly in all directions.

The projection lens 30 receives the combined light provided by the uniaxial crystal 21*c*, and then magnifies the combined light up to a predetermined magnification for emission. In the combined light, the color light is all in the non-polarized state. Thereafter, the light in the non-polarized state uniformly in all directions is directed onto the screen.

Herein, the uniaxial crystal 21*c* is disposed on the light-emission side of the color synthesis prism 11 such that the slow axis forms an angle of 45° or 135° against the incoming polarized light.

With the projection apparatus 1-5 configured as above, the light directed to the screen and the light reflected thereon is in the non-polarized state uniformly in all directions. This accordingly considerably improves the quality of 3D images with totally no color unevenness when 3D glasses are not tilted, and with totally no color unevenness and brightness reduction when the 3D glasses are tilted.

In the projection apparatuses 1-1 to 1-5, a plastic lens may be used for the projection lens 30, i.e., a plastic lens greatly affecting the polarization patterns of light may be used. Moreover, with the use of the SPS-model color synthesis prism 11 in such an optical configuration as the projection apparatus 1-5, the 2D brightness becomes maximum. The projection apparatus 1-5 of FIG. 16 is in the optimum optical state.

Described next is the placement of the polarization conversion section 20 in the projection apparatus 1. FIG. 17 is a diagram showing an exemplary placement. A projection apparatus 1*a*-1 includes the color synthesis prism 11 (SPS-model), the half waveplate 12, the polarization conversion section 20, and the projection lens 30.

On the light-incident side of the color synthesis prism 11 where green light enters, the half waveplate 12 is disposed. On the light-emission side of the color synthesis prism 11 where combined light exits, the projection lens 30 is disposed. Moreover, between the light-incident side of the projection lens 30 and the light-emission side of the color synthesis prism 11, the polarization conversion section 20 is disposed. In this configuration, the polarization conversion section 20 is integral with the color synthesis prism 11 by being bonded to the light-emission surface thereof. Note that, in this placement, the half waveplate 12 may not be provided. The color synthesis prism 11 may be an SPS-model, an SSS-model, or any other model.

FIG. 18 is a diagram showing another exemplary placement. A projection apparatus 1*a*-2 includes the color synthesis prism 11 (SPS-model), the half waveplate 12, the polarization conversion section 20, and the projection lens 30.

On the light-incident side of the color synthesis prism 11 where green light enters, the half waveplate 12 is disposed. On the light-emission side of the color synthesis prism 11 where combined light exits, the projection lens 30 is disposed. Moreover, between the light-incident side of the projection lens 30 and the light-emission side of the color synthesis prism 11, a mechanism frame component 4*a* is provided. The mechanism frame component 4*a* is a mechanism portion for mounting of the polarization conversion section 20.

The polarization conversion section 20 is insertable/removable to/from the mechanism frame component 4*a*. By being inserted into the mechanism frame component 4*a*, the polarization conversion section 20 is fixedly disposed between the light-emission side of the color synthesis prism 11 and the light-incident side of the projection lens 30. Note that, in this placement, the half waveplate 12 may not be provided. The color synthesis prism 11 may be an SPS-model, an SSS-model, or any other model.

Figure 19:
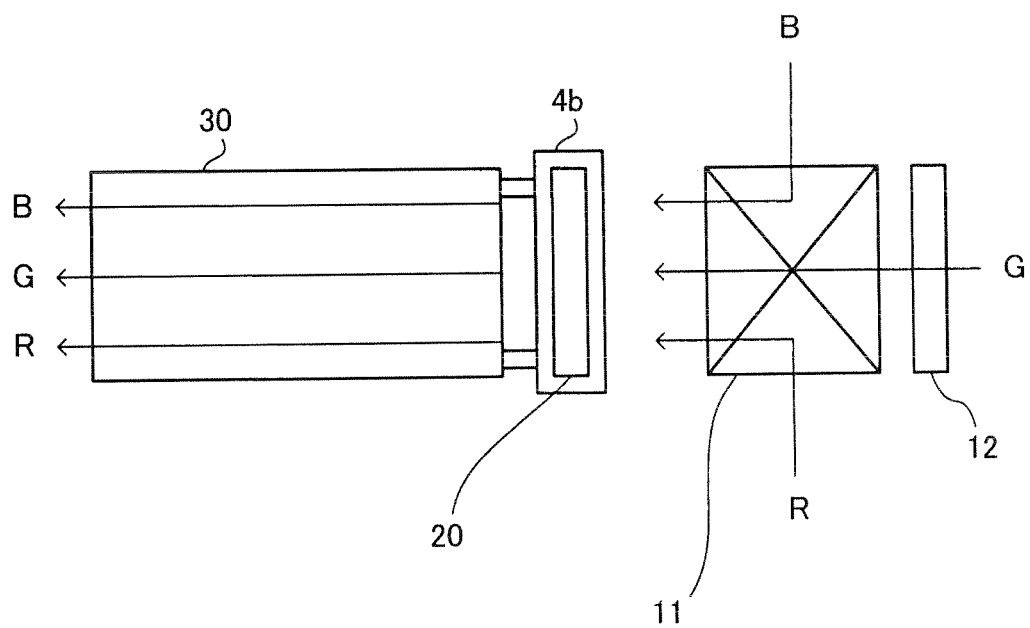
FIG. 19 is a diagram showing still another exemplary placement.

FIG. 19 is a diagram showing another exemplary placement. A projection apparatus 1*a*-3 includes the color synthesis prism 11 (SPS-model), the half waveplate 12, the polarization conversion section 20, and the projection lens 30.

On the light-incident side of the color synthesis prism 11 where green light enters, the half waveplate 12 is disposed. On the light-emission side of the color synthesis prism 11 where combined light exits, the projection lens 30 is disposed. Moreover, on the light-incident surface of the projection lens 30, a mechanism frame component 4*b* is provided. The mechanism frame component 4*b* is a mechanism portion for mounting of the polarization conversion section 20.

The projection lens 30 includes a lens shift mechanism that moves the lens to shift vertically and horizontally, for example. The mechanism frame component 4*b* also follows the shifting movement of the projection lens 30. As for such a mechanism frame component 4*b*, the polarization conversion section 20 is insertable/removable thereto/therefrom. By being inserted into the mechanism frame component 4*b*, the polarization conversion section 20 is located in the vicinity of the light-incident surface side of the projection lens 30 while always following the shifting movement of the projection lens 30. Note that, in this placement, the half waveplate 12 may not be provided. The color synthesis prism 11 may be an SPS-model, an SSS-model, or any other model.

Described next is a light source for use in the projection apparatus 1. The projection apparatus 1 uses a light source with wide-range-wavelength continuous emission spectrum, or a light source with wide-range-wavelength continuous emission spectrum for RGB projection light, for example.

As such, a general LCD projector uses a continuous-wavelength light source such as a UHP (Ultra High Performance) lamp or an Xe (xenon) lamp. Therefore, the functions of the projection apparatus 1 are applicable practically to almost every LCD projector.

Described next are differences between the previous technology and the present technology. FIG. 20 is a conceptual view of projection by each projection apparatus. With a projection apparatus 300 of the previous technology, as for light coming therefrom, light entering the screen 7 and light reflected on the screen 7 are not put in the non-polarized state. On the other hand, with the projection apparatus 1 according to the embodiment of the present technology, as for light coming therefrom, light entering the screen 7 and light reflected on the screen 7 are both put in the non-polarized state uniformly in all directions.

As described above, in the projection apparatus 1, the polarization conversion section 20 is provided between the light-emission side of the color synthesis prism 11 where combined light exits, and the light-incident side of the projection lens 30. As such, compared with the configuration including the polarization conversion section 20 on the light-emission side of the projection lens 30, the polarization conversion section 20 disposed closer to the color synthesis prism 11, i.e., on the light-emission side thereof, leads to the RGB projection light entirely in the non-polarized state uniformly in all directions.

This thus leads to 3D images with totally no color unevenness through 3D glasses with no tilt thereof. Moreover, with a tilt of about ±25° of the 3D glasses (expected use range for customers), for example, the resulting 3D images are with totally no color unevenness and brightness reduction through the 3D glasses.

Further, the projection apparatus 1 is ready for use in a whole category of LCD projectors adopting the 3D active-shutter technology, a whole category of optical members, or a whole category of usage environments, and thus has high compatibility and is excellent in serviceability. That is, the projection apparatus 1 is ready for use in a whole category of LCD projectors including reflective and transmissive LCDs, and also in a whole category of color synthesis prisms (SPS-model and SSS-model), for example.

Still further, a plastic lens may be used for the projection lens and the like, and the use of a whole category of screens is possible, e.g., silver screen, bead screen, and mat screen.

As for the cost when the polarization conversion section 20 in use is the uniaxial crystal 21c, the uniaxial crystal 21c is much cheaper than the wavelength-selective half waveplate 21a on the light-incident side of the projection lens 30, and is expected to produce a better effect. The uniaxial crystal 21c itself is less expensive, and when the color synthesis prism is small in area, the cost thereof is further reduced. On the other hand, the wavelength-selective half waveplate 21a itself is expensive, and when it is expected to be larger in size, the cost thereof is further increased. The cost of the uniaxial crystal 21c (crystal) is about ¼ to ⅕ of the wavelength-selective half waveplate 21a and of the uniaxial organic material 21b.

The present technology is also in the following structures.

(1) A projection apparatus, including:

a color synthesis section configured to combine three-primary color light and emit combined light;

a polarization conversion section disposed on a light-emission side of the color synthesis section, the polarization conversion section being configured to put the color light in the combined light in a non-polarized state uniformly in all directions; and a projection lens configured to emit light provided by the polarization conversion section.

(2) The projection apparatus according to (1), in which the polarization conversion section includes any one of a wavelength-selective half waveplate, a uniaxial organic material, and a uniaxial crystal, the wavelength-selective half waveplate producing a phase shift of π with respect to light with a predetermined wavelength, the uniaxial organic material being an organic material having one optical axis, the uniaxial crystal being a crystal having one optical axis.

(3) The projection apparatus according to (1) or (2), in which the color synthesis section includes a color synthesis prism, and a half waveplate disposed on a light-incident side of the color synthesis prism where green light enters, the polarization conversion section includes the uniaxial crystal, the half waveplate converts S-polarized green light into P-polarized green light, the color synthesis prism combines red S-polarized light being S-polarized red light, green P-polarized light being the P-polarized green light, and blue S-polarized light being S-polarized blue light, and the uniaxial crystal puts the red S-polarized light, the green P-polarized light, and the blue S-polarized light in the non-polarized state.

(4) The projection apparatus according to (1) or (2), in which the color synthesis section includes a color synthesis prism, and a half waveplate disposed on a light-incident side of the color synthesis prism where green light enters, the half waveplate converts S-polarized green light into P-polarized green light, the color synthesis prism combines red S-polarized light being S-polarized red light, green P-polarized light being the P-polarized green light, and blue S-polarized light being S-polarized blue light, and the polarization conversion section puts the red S-polarized light, the green P-polarized light, and the blue S-polarized light in the non-polarized state.

(5) The projection apparatus according to (1) or (2), in which the color synthesis section includes a color synthesis prism, a half waveplate disposed on a light-incident side of the color synthesis prism where green light enters, and a quarter waveplate disposed between a light-incident side of the polarization conversion section and a light-emission side of the color synthesis prism, the half waveplate converts S-polarized green light into P-polarized green light, the color synthesis prism combines red S-polarized light being S-polarized red light, green P-polarized light being the P-polarized green light, and blue S-polarized light being S-polarized blue light, the quarter waveplate converts the red S-polarized light into red left-handed circularly-polarized light being left-handed circularly-polarized light, the green P-polarized light into green right-handed circularly-polarized light being right-handed circularly-polarized light, and the blue S-polarized light into blue left-handed circularly-polarized light being left-handed circularly-polarized light, and the polarization conversion section puts each of the red left-handed circularly-polarized light, the green right-handed circularly-polarized light, and the blue left-handed circularly-polarized light in the non-polarized state.

(6) The projection apparatus according to (1) or (2), in which the color synthesis section includes a color synthesis prism, the color synthesis prism combines red S-polarized light being S-polarized red light, green S-polarized light being S-polarized green light, and blue S-polarized light being S-polarized blue light, and the polarization conversion section puts the red S-polarized light, the green S-polarized light, and the blue S-polarized light in the non-polarized state.

(7) The projection apparatus according to (1) or (2), in which the color synthesis section includes a color synthesis prism, and a quarter waveplate disposed between a light-incident side of the polarization conversion section and a light-emission side of the color synthesis prism, the color synthesis prism combines red S-polarized light being S-polarized red light, green S-polarized light being S-polarized green light, and blue S-polarized light being S-polarized blue light, the quarter waveplate converts the red S-polarized light into red left-handed circularly-polarized light being left-handed circularly-polarized light, the green S-polarized light into green left-handed circularly-polarized light being left-handed circularly-polarized light, and the blue S-polarized light into blue left-handed circularly-polarized light being left-handed circularly-polarized light, and the polarization conversion section puts each of the red left-handed circularly-polarized light, the green left-handed circularly-polarized light, and the blue left-handed circularly-polarized light in the non-polarized state.

(8) The projection apparatus according to any one of (1) to (7), in which the polarization conversion section is integral with the color synthesis prism by being bonded to a light-emission surface of the color synthesis prism in the color synthesis section.

(9) The projection apparatus according to any one of (1) to (7), in which the polarization conversion section is fixedly disposed via an attachment mechanism section, the attachment mechanism section being provided between a light-emission side of the color synthesis prism in the color synthesis section and a light-incident side of the projection lens.

(10) The projection apparatus according to any one of (1) to (7), in which the polarization conversion section follows a shifting movement of the projection lens by being provided in a vicinity of a light-incident surface side of the projection lens.

The present disclosure contains subject matter related to that disclosed in Japanese Priority Patent Application JP 2011-259204 filed in the Japan Patent Office on Nov. 28, 2011, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A projection apparatus, comprising:
a color synthesis prism configured to combine three-primary color light and emit combined light;
a polarizer configured to put the combined light in a non-polarized state;
a quarter waveplate disposed in a light path between a light-incident side of the polarizer and a light-emission side of the color synthesis prism, the quarter waveplate configured to convert between linearly-polarized light and circularly-polarized light; and
a projection lens in a light path with the color synthesis prism and configured to emit the combined non-polarized light provided by the polarizer,
wherein the polarizer is disposed in the light path between the color synthesis prism and the projection lens.

2. The projection apparatus according to claim 1, wherein the polarizer includes any one of a wavelength-selective half waveplate, a uniaxial organic material, and a uniaxial crystal, the wavelength-selective half waveplate producing a phase shift of π with respect to light with a predetermined wavelength, the uniaxial organic material being an organic material having one optical axis, the uniaxial crystal being a crystal having one optical axis.

3. The projection apparatus according to claim 2, wherein the color synthesis prism includes
a half waveplate disposed on a light-incident side of the color synthesis prism where green light enters,
the polarizer includes the uniaxial crystal,
the half waveplate converts S-polarized green light into P-polarized green light,
the color synthesis prism combines red S-polarized light being S-polarized red light, green P-polarized light being the P-polarized green light, and blue S-polarized light being S-polarized blue light, and
the uniaxial crystal puts the red S-polarized light, the green P-polarized light, and the blue S-polarized light in the non-polarized state.

4. The projection apparatus according to claim 2, wherein the color synthesis prism includes
a half waveplate disposed on a light-incident side of the color synthesis prism where green light enters,
the half waveplate converts S-polarized green light into P-polarized green light,
the color synthesis prism combines red S-polarized light being S-polarized red light, green P-polarized light being the P-polarized green light, and blue S-polarized light being S-polarized blue light, and
the polarizer puts the red S-polarized light, the green P-polarized light, and the blue S-polarized light in the non-polarized state.

5. The projection apparatus according to claim 2, wherein,
the color synthesis prism combines red S-polarized light being S-polarized red light, green S-polarized light being S-polarized green light, and blue S-polarized light being S-polarized blue light, and
the polarizer puts the red S-polarized light, the green S-polarized light, and the blue S-polarized light in the non-polarized state.

6. The projection apparatus according to claim 1, wherein the polarizer is integral with the color synthesis prism by being bonded to a light-emission surface of the color synthesis prism.

7. The projection apparatus according to claim 1, wherein the polarizer is fixedly disposed via an attachment mechanism section, the attachment mechanism section being provided between a light-emission side of the color synthesis prism and a light-incident side of the projection lens.

8. The projection apparatus according to claim 1, wherein the polarizer follows a shifting movement of the projection lens by being provided in a vicinity of a light-incident surface side of the projection lens.

9. A projection apparatus comprising:
a color synthesis section configured to combine three-primary color light and emit combined light,
a polarization conversion section disposed on a light-emission side of the color synthesis section, the polarization conversion section being configured to put the color light in the combined light in a non-polarized state uniformly in all directions and including any one of a wavelength-selective half waveplate, a uniaxial organic material, and a uniaxial crystal, the wavelength-selective half waveplate producing a phase shift of π with respect to light with a predetermined wavelength, the uniaxial organic material being an organic material having one optical axis, the uniaxial crystal being a crystal having one optical axis; and
a projection lens configured to emit light provided by the polarization conversion section, wherein
the color synthesis section includes
a color synthesis prism,
a half waveplate disposed on a light-incident side of the color synthesis prism where green light enters, and
a quarter waveplate disposed between a light-incident side of the polarization conversion section and a light-emission side of the color synthesis prism,
the half waveplate converts S-polarized green light into P-polarized green light,
the color synthesis prism combines red S-polarized light being S-polarized red light, green P-polarized light being the P-polarized green light, and blue S-polarized light being S-polarized blue light,
the quarter waveplate converts the red S-polarized light into red left-handed circularly-polarized light being left-handed circularly-polarized light, the green P-polarized light into green right-handed circularly-polarized light being right-handed circularly-polarized light, and the blue S-polarized light into blue left-handed circularly-polarized light being left-handed circularly-polarized light, and
the polarization conversion section puts each of the red left-handed circularly-polarized light, the green right-handed circularly-polarized light, and the blue left-handed circularly-polarized light in the non-polarized state.

10. A projection apparatus according comprising:
a color synthesis section configured to combine three-primary color light and emit combined light,
a polarization conversion section disposed on a light-emission side of the color synthesis section, the polarization conversion section being configured to put the color light in the combined light in a non-polarized state uniformly in all directions and including any one of a wavelength-selective half waveplate, a uniaxial organic material, and a uniaxial crystal, the wavelength-selective half waveplate producing a phase shift of π with respect to light with a predetermined wavelength, the uniaxial organic material being an organic material having one optical axis, the uniaxial crystal being a crystal having one optical axis; and
a projection lens configured to emit light provided by the polarization conversion section, wherein
the color synthesis section includes
a color synthesis prism, and
a quarter waveplate disposed between a light-incident side of the polarization conversion section and a light-emission side of the color synthesis prism,
the color synthesis prism combines red S-polarized light being S-polarized red light, green S-polarized light being S-polarized green light, and blue S-polarized light being S-polarized blue light,
the quarter waveplate converts the red S-polarized light into red left-handed circularly-polarized light being left-handed circularly-polarized light, the green S-polarized light into green left-handed circularly-polarized light being left-handed circularly-polarized light, and the blue S-polarized light into blue left-handed circularly-polarized light being left-handed circularly-polarized light, and
the polarization conversion section puts each of the red left-handed circularly-polarized light, the green left-handed circularly-polarized light, and the blue left-handed circularly-polarized light in the non-polarized state.

* * * * *